(12) United States Patent
Grünewald et al.

(10) Patent No.: US 11,826,723 B2
(45) Date of Patent: Nov. 28, 2023

(54) BELT DRIER ARRANGEMENT FOR DRYING AN AQUEOUS POLYMER GEL AND FOR COMMINUTING THE DRIED POLYMER GEL TO GIVE DRIED POLYMER PARTICLES AND PROCESS FOR DRYING AN AQUEOUS POLYMER GEL AND FOR COMMINUTING THE DRIED POLYMER GEL TO GIVE DRIED POLYMER PARTICLES

(71) Applicant: BASF SE, Ludwigshafen am Rhein (DE)

(72) Inventors: Gerald Grünewald, Ludwigshafen (DE); Rüdiger Funk, Luwigshafen (DE); Matthias Weismantel, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 1336 days.

(21) Appl. No.: 16/305,093

(22) PCT Filed: May 24, 2017

(86) PCT No.: PCT/EP2017/062514
§ 371 (c)(1),
(2) Date: Nov. 28, 2018

(87) PCT Pub. No.: WO2017/207374
PCT Pub. Date: Dec. 7, 2017

(65) Prior Publication Data
US 2020/0316561 A1     Oct. 8, 2020

(30) Foreign Application Priority Data
May 31, 2016  (EP) ..................... 16172266

(51) Int. Cl.
*F26B 17/04* (2006.01)
*B02C 13/06* (2006.01)
*B02C 21/00* (2006.01)
*B01J 20/26* (2006.01)
*B01J 20/28* (2006.01)
(Continued)

(52) U.S. Cl.
CPC ......... *B01J 20/26* (2013.01); *B01J 20/28016* (2013.01); *B01J 20/28047* (2013.01);
(Continued)

(58) Field of Classification Search
CPC .. B02C 21/00; B02C 13/06; C08J 3/12; C08F 6/008
See application file for complete search history.

(56) References Cited

U.S. PATENT DOCUMENTS 5,669,559 A    9/1997 Wagner et al.
5,906,322 A *  5/1999 Hama ................... B02C 18/186
                                         241/243
(Continued)

FOREIGN PATENT DOCUMENTS

CN  101516924 A   8/2009
JP  H10118515 A   5/1998
(Continued)

OTHER PUBLICATIONS

International Search Report for PCT Patent Application No. PCT/EP2017/062514, dated Aug. 25, 2017.
(Continued)

*Primary Examiner* — Bobby Yeonjin Kim
(74) *Attorney, Agent, or Firm* — MARSHALL, GERSTEIN & BORUN LLP

(57) ABSTRACT

The invention relates to a belt drier arrangement for drying an aqueous polymer gel and for comminuting the dried polymer gel to give dried polymer particles, comprising:
 a drier setup for drying an aqueous polymer gel,
 a comminuting arrangement downstream of the drier setup relative to the product flow direction, for com-
(Continued)

Figure 1:
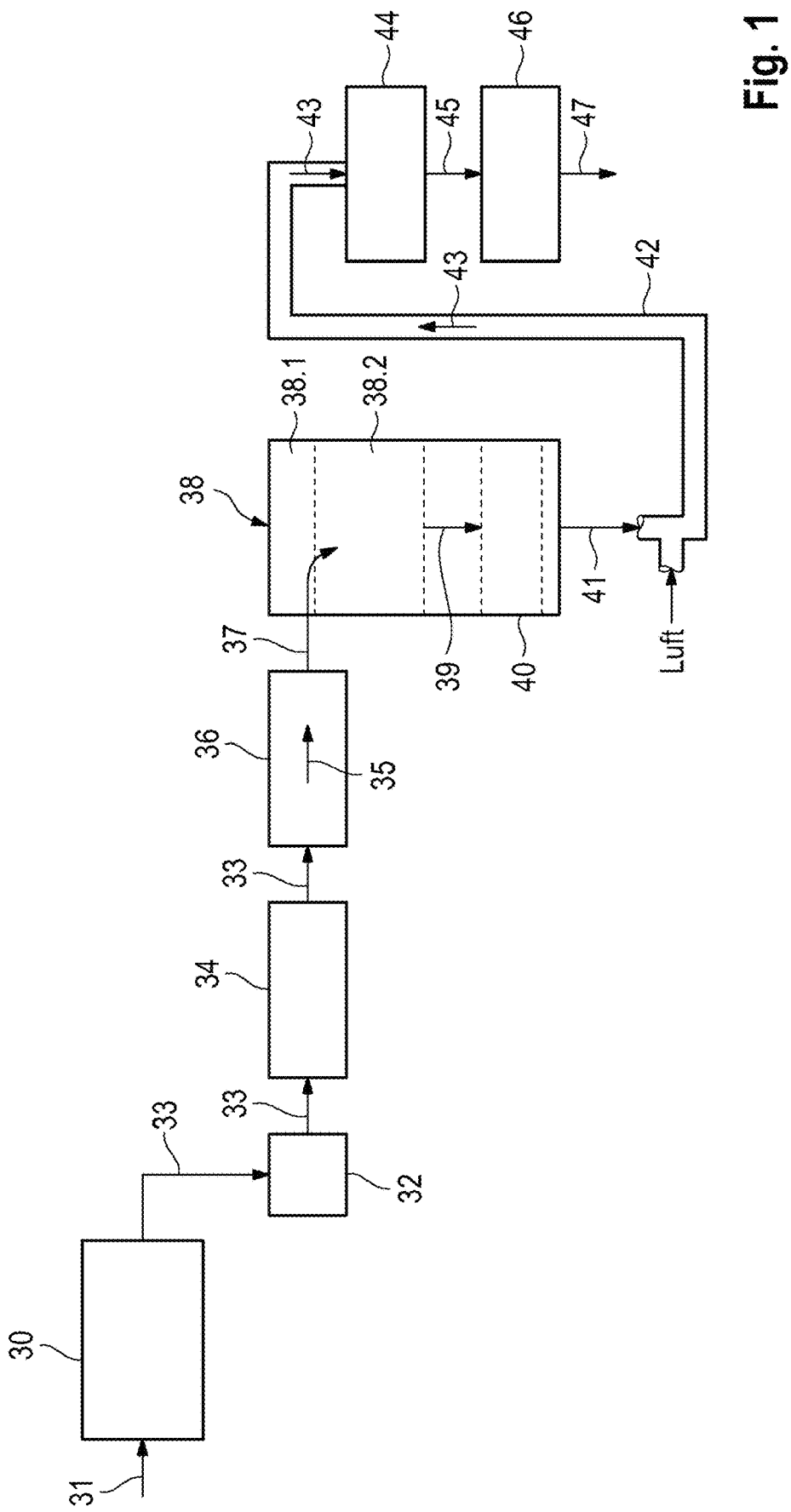

minuting the dried polymer gel to give dried polymer particles. In accordance with the invention the comminuting arrangement comprises at least a first comminutor and a second comminutor, each having a rotatable shaft with functional tools, the second comminutor being disposed downstream of the first comminutor relative to the product flow direction.

23 Claims, 10 Drawing Sheets

(51) Int. Cl.
*B01J 20/30* (2006.01)
*C08J 3/075* (2006.01)

(52) U.S. Cl.
CPC ....... *B01J 20/3021* (2013.01); *B01J 20/3078* (2013.01); *B02C 13/06* (2013.01); *B02C 21/00* (2013.01); *C08J 3/075* (2013.01); *F26B 17/04* (2013.01)

(56) References Cited

U.S. PATENT DOCUMENTS

| | | | |
|---|---|---|---|
| 6,641,064 B1 * | 11/2003 | Dentler | C08J 3/12 241/24.28 |
| 9,102,804 B2 * | 8/2015 | Machida | C08J 3/122 |
| 9,327,270 B2 | 5/2016 | Stueven et al. | |
| 2008/0194402 A1 | 8/2008 | Chevigny | |
| 2012/0283401 A1 * | 11/2012 | Funk | C08F 6/008 526/181 |
| 2014/0314473 A1 * | 10/2014 | Stephan | B02C 13/2804 228/164 |

FOREIGN PATENT DOCUMENTS

| | | | | |
|---|---|---|---|---|
| JP | 2015-048386 A | 3/2015 | | |
| JP | 5718816 B2 | 5/2015 | | |
| KR | 100307689 B1 | 12/2001 | | |
| WO | WO-2013/072419 A1 | 5/2013 | | |
| WO | WO-2014/044780 A1 | 3/2014 | | |
| WO | WO-2014044780 A1 * | 3/2014 | ............ C08F 220/06 |
| WO | WO-2014/084281 A1 | 6/2014 | | |
| WO | WO-2015/074966 A1 | 5/2015 | | |
| WO | WO-2015/163512 A1 | 10/2015 | | |
| WO | WO-2015163512 A1 * | 10/2015 | ................ C08F 2/01 |

OTHER PUBLICATIONS

Buchholz, et al., eds., "Modern Superabsorbent Polymer Technology," Wiley-VCH, NY, NY (1998), pp. 71-103.

* cited by examiner (B1)

(B2)

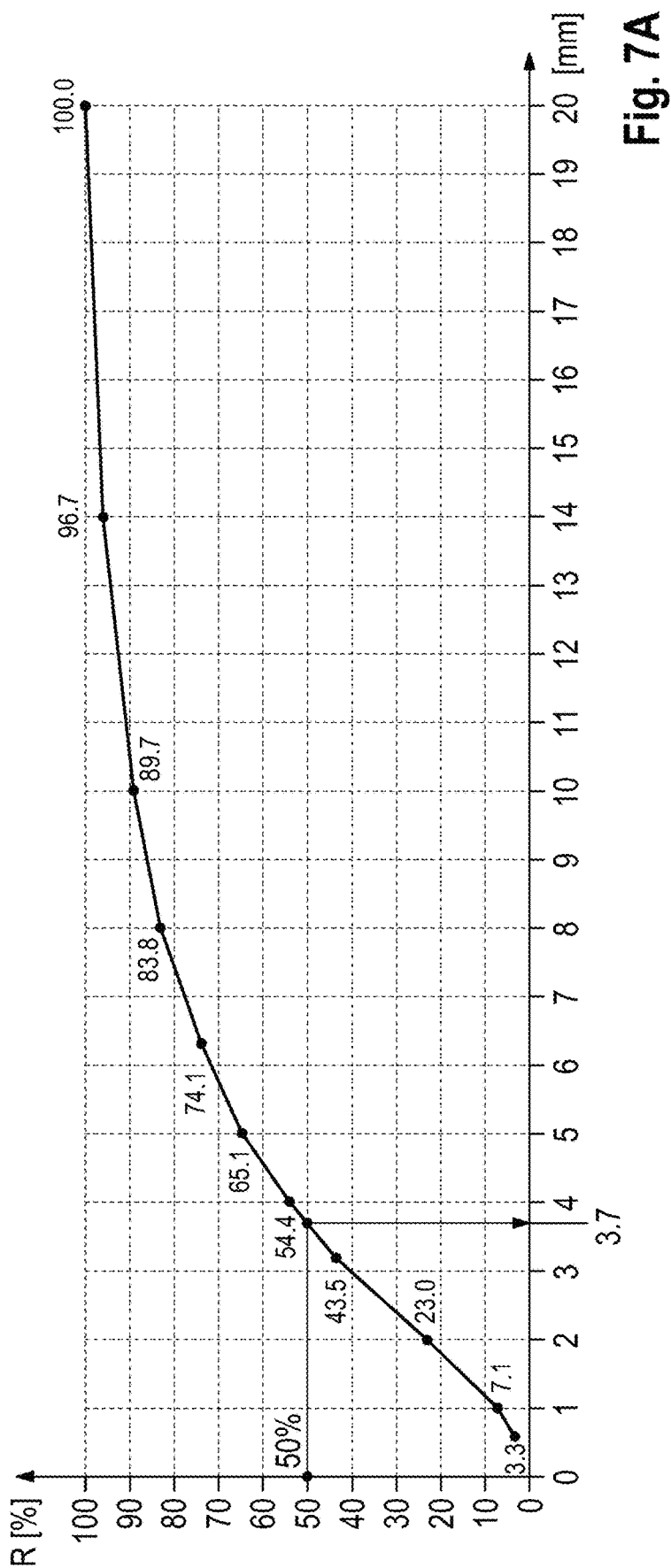

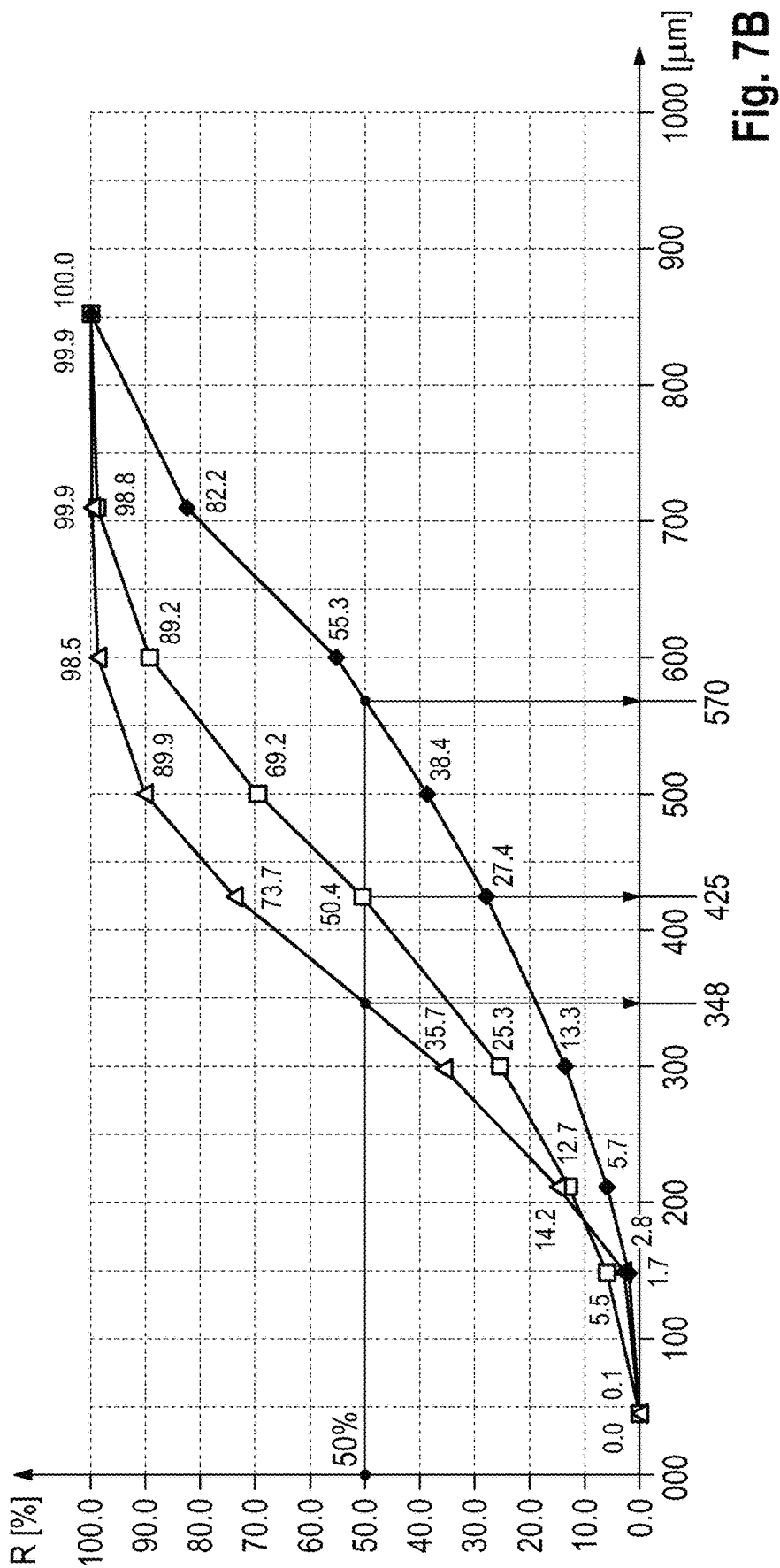

BELT DRIER ARRANGEMENT FOR DRYING AN AQUEOUS POLYMER GEL AND FOR COMMINUTING THE DRIED POLYMER GEL TO GIVE DRIED POLYMER PARTICLES AND PROCESS FOR DRYING AN AQUEOUS POLYMER GEL AND FOR COMMINUTING THE DRIED POLYMER GEL TO GIVE DRIED POLYMER PARTICLES

CROSS-REFERENCE TO RELATED APPLICATIONS

This is a U.S. national phase of International Application No. PCT/EP2017/062514 filed May 24, 2017, which claims the benefit of European Patent Application No. 16172266.5, filed May 31, 2016.

The invention relates to a belt drier arrangement for drying an aqueous polymer gel and for comminuting the dried polymer gel to give dried polymer particles, according to the preamble of claim 1. The invention further relates to a process for drying an aqueous polymer gel and for comminuting the dried polymer gel to give dried polymer particles, according to the preamble of claim 20.

Water-absorbing or superabsorbent polymers (SAPs, called superabsorbents for short), so called, are crosslinked hydrophilic polymers that can absorb several times their mass in the dry state (sometimes more than one thousand times) of liquids, such as, for example, water or similar fluids.

The main field of use of superabsorbents is in the hygiene sector and also plays a major role in the medical sector, in wound dressings and plasters. Further important fields of use for superabsorbents are agriculture and horticulture, where superabsorbents are used in order to improve the ability of soil to store moisture.

The demands on a superabsorbent depend on the particular field of use, and for that reason the properties of the superabsorbents (for example, the degree of swelling and the swelling rate) have to be adjusted correspondingly. A matter of significance for this purpose is whether the absorption of the liquid to be absorbed is to take place under pressure and/or at relatively high temperature, this being especially important for the use of superabsorbents in incontinence products. Other matters of major significance are the nature and composition of the liquid to be absorbed, since the degree of swelling of a superabsorbent is significantly affected by the salt content of the swelling agent.

The water-absorbing polymers are especially polymers formed from (co)polymerized hydrophilic monomers, graft copolymers of one or more hydrophilic monomers on a suitable graft base, crosslinked cellulose or starch ethers, crosslinked carboxymethylcellulose, partly crosslinked polyalkylene oxide, or natural products swellable in aqueous liquids, such as guar derivatives, for example. Water-absorbing polymers of this kind are used to manufacture diapers, tampons and sanitary napkins, but also as water-retaining agents in market gardening.

A production process for water-absorbent polymer particles has the following steps: polymerizing an aqueous monomer solution or monomer suspension to produce a polymer gel; drying the aqueous polymer gel in a belt drier with a conveying belt, involving the aqueous polymer gel being received on the conveying belt and the conveying of the polymer gel on the conveying belt in a conveying direction; crushing and/or grinding of the dried polymer gel to give polymer particles.

The production of the water-absorbing polymers is described for example in the monograph "Modern Super Absorbent Polymer Technology" by F. L. Buchholz and A. T. Graham, Wiley-VCH, 1998 or in Ullmann's "Encyclopedia of Industrial Chemistry", $6^{th}$ edition, volume 35, pages 73 to 103.

For drying, a belt drier, configured more particularly as an air circulation belt drier for guiding circulated air, with a drier set up largely comprising the conveying belt and with an air recycling conduit downstream of the drier setup for air recycling is formed. Here, recycled air is withdrawn from the drier setup and fed back to the drier setup via the air recycling conduit. The air recycling conduit has an air withdrawal conduit formed between an upstream intake section relative to air flow direction in the drier setup, and a downstream discharge section relative to air flow direction in the air recycling conduit.

A superabsorbent polymer in the aqueous polymer gel state is regarded as being in a wet state and hence can also be referred to in general terms as wet material; in other words, the aqueous polymer gel still has a considerable proportion of water before drying; especially as described below. The aqueous polymer gel is obtained by polymerizing a monomer solution or suspension. The aqueous polymer gel of still-aqueous polymer particles is preferably introduced into the belt drier in granular form, for example with a solids content of 40-60%. In this state, the polymer gel is basically already in crosslinked form with a desired degree of crosslinking, especially in homogeneously crosslinked form at first, especially with a comparatively low degree of crosslinking, especially, as described further below, barely surface crosslinked at all at first.

A superabsorbent polymer in a water-absorbing polymer particle state is considered to be in a state after drying; in other words, it has a low residual water content of the polymer particles after the drying of the aqueous polymer gel, especially as described below; the superabsorbent polymer is thus preferably in the form of a dried polymer gel, thus especially of dried polymer particles. In this state, the water-absorbing polymer particles can preferably be post-crosslinked, especially surface crosslinked, in which case the degree of surface crosslinking is preferably above the abovementioned comparatively low degree of initially homogeneous crosslinking. Preferably, after the polymerization, an aqueous polymer gel of the water-absorbing polymers is obtained, which is dried. The principles of drying of the aqueous polymer gel to give a water-absorbing polymer comprising water-absorbing, especially dried, polymer particles is likewise described in the monograph "Modern Super Absorbent Polymer Technology" by F. L. Buchholz and A. T. Graham, Wiley-VCH, 1998, on pages 87 to 93.

In the belt drier, the aqueous polymer gel is dried to give a partly dried polymer gel and hence takes the form of a dry cake. The dry cake preferably takes the form of a strand of partly dried polymer gel, i.e. of a partly dried polymer strand, on the belt of the belt drier, which thus extends through the drier setup of the belt drier.

The dry cake, at the end of the belt drier, i.e. on leaving the drier setup, is in the form of a substantially dried strand of dried polymer gel, for instance in the form of a slab or of a sheetlike strand, i.e. of a dried polymer strand. The partly dried polymer gel and the dried polymer gel of the dry cake are sometimes already referred to hereinafter by the terminology "dried polymer particles"; both cases are covered by the terms "superabsorbent or water-absorbing polymer gel" or "dried polymer gel", as opposed to "aqueous polymer gel".

An intake module of the belt drier serves for taking in the superabsorbent polymer in the form of the aqueous polymer particles. In practice the drying conditions are then selected, and represent a compromise between full utilization of drier capacity and the processing qualities of the water-absorbing polymer particles. Compared to other designs of drier, the belt drier has the advantage that (apart from gravity) there is no significant mechanical stress that impairs the product, since the aqueous polymer gel or the water-absorbing polymer particles lie loose on a conveying belt. In principle a belt drier offers the option of configuring the construction of one or more control zones by means of one or more drier zones.

A belt drier comprises, for example, a product feed module for the intake of polymer, a number of drier modules for forming one or more drier zones, and a discharge module for polymer discharge. A discharge module serves to discharge the superabsorbent polymer in the form of the water-absorbing polymer particles; more particularly, the conveying belt ends in the discharge module or has a turning point therein. In the discharge module, at the end of the belt drier, the superabsorbent polymer may fall onto a crusher or similar comminutor or may be fed to such a crusher or comminutor. For this purpose, the dry cake may be fed as a whole to the comminutor or in the form of crushed dry cake material or of other coarse chunks of the dry cake. The dried and as yet uncomminuted polymer particles are then present partly as crushed dried polymer gel, in the form of comparatively coarse chunks, for example, and partly in the form of an unavoidable crush residue with dried polymer gel.

The comminuting in the comminutor then produces consistently dried polymer particles of dried polymer gel. The crush residue of dried polymer gel and residues resulting from the comminution, in particular, comprise fine powder pieces of polymer particles encompassing fine and ultrafine particles. Following comminution, the dried and comminuted polymer particles are introduced preferably into a pneumatic conveying facility and are fed to a grinding operation; in other words, they are subsequently processed further to give ground dried polymer particles.

WO 2015/163512 A1 describes a production process for water-absorbing polymer particles that involves the drying of a polymer gel. After the drying, the dried polymer gel is fed to a first grinding step in a first grinding facility, then to a residence facility, and then to a second grinding step in a second grinding facility. The residence times in the first and second grinding facilities are in the region of 3 minutes and the residence time in the residence facility is 30 min or more, always well above a residence time in a grinding facility. The residence facility prevents lumped material entering the further conveying facility. In relation to particle sizes, the grinding takes place at 150 µm.

Ground dried polymer particles especially may be sent to a sieving operation. A midsize fraction may have an already preferred desired particle size and can be separated off at this early stage. An oversize fraction or fines fraction can optionally be ground, sieved or processed once again and added to the midsize fraction. The dried, ground and sieved polymer particles of the midsize fraction can be surface reprocessed. The dried, ground and sieved and surface reprocessed polymer particles can be subjected to safeguard sieving.

In the drying process, it is possible to use continuous convection belt driers; this relates hereinafter to a belt drier of the type specified at the outset, especially an air circulation belt drier. The belt drier specified at the outset is configured particularly for an aqueous polymer gel, especially for formation of a deformable, pasty product of limited flowability, in piece form. In a continuous belt drier, the product layer of an aqueous polymer gel, applied in the form of an aggregate through which air can flow, on a perforated conveying belt is transported through the drying space and dried in the process at first to give partly dried polymer gel and finally to give dried polymer gel; the latter is then processed further to give the abovementioned dried polymer particles as water-absorbing polymer particles.

The drying gas that flows through the product layer of the dry cake of partly dried polymer gel and then dried polymer gel serves both to introduce heat into the aqueous polymer gel to be dried or into the partly dried water-absorbing polymer particles and to transport evaporating moisture away. The drying gas used is preferably air as drying air. In an air circulation belt drier, the drying air that flows through the product layer is additionally conducted as circulating air.

Belt driers with conveyor belts are different from belt reactors. Whereas a belt reactor is used to produce aqueous polymer gel from its constituents, a belt drier is used to produce water-absorbing polymer particles from an aqueous polymer gel, especially to produce the stated water-absorbing polymer particles, preferably from an aqueous polymer gel that has first been homogeneously crosslinked with the desired degree of crosslinking and optionally also surface-crosslinked.

WO2015/074966A1 describes a plate-type belt drier for superabsorbent polymers (SAPs, called superabsorbents for short) with a comminutor. A comminutor of this kind in the form of a cross-vane comminutor is known in principle and is employed for comminuting SAPs, and is available commercially. An example can be seen, for instance, from the Internet representation of the company Grenzebach, https://www.yumpu.com/de/document/view/6323642/thermische-verfahrenstechnik-grenzebach-maschinenbau-gmbh.

A cross-vane comminutor from the applicant is described in principle in relation to SAP production in WO2013/072419 and reproduced schematically in FIG. 1. This cross-vane comminutor comprises a shaft, which accommodates a multiplicity of bars. Alongside the bars disposed on the shaft, the cross-vane comminutor comprises a multiplicity of fixedly mounted bars which engage into interstices of the bars disposed on the shaft. The poly(meth)acrylate chunks fed into the comminutor fall onto the fixedly mounted bars, where they remain lying. The bars as they corotate with the shaft break up the chunks.

WO2014/044780A1 provides a general disclosure of a crusher in combination with an adjustable guiding means in the form of a grid, which additionally brings about some comminution of SAP chunks.

There is a desire for improved comminution of dried polymer particles in the coarse crushed material and/or the coarse chunks, from a dried polymer strand of the dry cake at the end of a conveying belt of a belt drier. An essential reason for this is on the one hand that the properties of the crushed material or chunks of dried polymer gel in relation to hardness and consistency may vary and therefore the comminuting capacity of a comminutor is manifested differently. On the other hand, for pneumatic conveying and/or grinding, an advantage is that a largely homogenized product flow of already well-comminuted polymer particles is provided from the dry cake, the coarse crushed material or the chunks of dried polymer gel, and can be introduced into the pneumatic conveying with, in particular, comparatively constant parameters.

It is an object of the invention to specify improved apparatus and an improved process for drying an aqueous polymer gel and for comminuting the dried polymer gel to give dried polymer particles. The intention more particularly is that the dried polymer gel in the form of polymer strand, more particularly dry cake, crushed material or chunks of the dry cake, should be comminuted to give dried polymer particles in an improved way after drying and/or downstream of a belt drier. More particularly, the dried polymer particles, as part of the improved comminuting process for the dried polymer gel in the form of polymer strand, more particularly dry cake, crushed material or chunks of the dry cake, are to be comminuted with a particle size determined for subsequent pneumatic conveying and/or grinding.

Regarding the apparatus, the object is achieved by the invention with a belt drier arrangement for drying an aqueous polymer gel and for comminuting the dried polymer gel to give dried polymer particles, in accordance with claim 1.

The invention concerning the belt drier arrangement for drying an aqueous polymer gel and for comminuting the dried polymer gel to give dried polymer particles proceeds on the basis that the belt drier arrangement comprises:
a drier setup for drying an aqueous polymer gel,
a comminuting arrangement, in particular directly, downstream of the drier setup relative to the product flow direction, for comminuting the dried polymer gel to give dried polymer particles.

In accordance with the invention
the comminuting arrangement comprises at least a first comminutor and a second comminutor, each having a rotatable shaft with functional tools, the second comminutor being disposed, in particular directly, downstream of the first comminutor relative to the product flow direction.

With regard to the process, the object is achieved by the invention with a process of claim 20.

In relation to the process, the basis for the invention is a process wherein an aqueous polymer gel is dried and the dried polymer gel is comminuted to give dried polymer particles with a comminuting arrangement, especially directly after the drier setup. In accordance with the invention, the comminuting arrangement comprises at least a first comminutor and a second comminutor having in each case a rotating shaft with functional tools, the second comminutor being disposed downstream, more particularly directly downstream, of the first comminutor relative to the product flow direction.

The comminuting arrangement is preferably designed for improved comminution of dried polymer particles directly from a dried polymer strand of the dry cake at the end of a conveying belt (belt drier belt) or of the coarse crushed material of the dry cake and/or of the coarse chunks from a dried polymer strand of the dry cake at the end of a conveying belt (belt drier belt) of a belt drier. The comminuting arrangement is accordingly disposed preferably directly downstream of the drier setup relative to the product flow direction, or is mounted on said drier setup.

The comminuting arrangement is advantageously arranged upstream of a conveying section relative to the product flow direction, and more particularly is arranged immediately upstream of an intake into a conveying section relative to the product flow direction.

The basis for the invention is the consideration that improved comminution of dried polymer particles directly from a dried polymer strand of the dry cake at the end of a conveying belt or of the coarse crushed material of the dry cake and/or of the coarse chunks of a dried polymer strand of the dry cake at the end of a conveying belt of a belt drier is problematic or barely achievable with a single comminutor.

Starting from this consideration, the invention has recognized that the utilization of a comminuting arrangement having at least a first comminutor and a second comminutor, each with a rotating shaft, is advantageous; more particularly between a polymer discharge after the end of the conveying belt of the belt drier, and before the pneumatic conveying facility.

Thus the first comminutor may already provide, from the coarse chunks, a product flow of coarsely comminuted dried polymer particles, which can be introduced into the second comminutor. This second comminutor then provides a product flow of well-comminuted, more particularly finely comminuted, dried polymer particles. This product flow, moreover, has advantageously already undergone substantial homogenization. The latter is to some extent already a result of the first and second comminutors being disposed one after the other, hence achieving a certain homogenization of the product flow.

Advantageous developments of the invention can be found in the dependent claims and indicate, in detail, advantageous possibilities for realizing the elucidated concept in the context of the problems addressed, and also in relation to further advantages.

A comminutor in the sense of the present application is intended generally to refer to a means which has at least one rotating roll (rotor); more particularly a rotating roll on its own (as in the case, for example, of a milling comminutor, milling cutter or cutting mill) or a rotating roll in combination with a stationary part (as in the case, for example, of a crusher, more particularly a cross-vane comminutor), or else a rotating roll in combination with one or with two or more rotating rolls (as in the case of a roll crusher, for example). This may also encompass a comminutor in the form of a conveying screw which, while serving primarily the purpose of conveying, nevertheless also definitively takes on a comminuting function. A comminutor therefore embraces at least all kinds of cutters, crushers and comminuting screws, but not grids or similar guiding means, since the latter do not have a rotating roll that serves actively to comminute dried polymer gel in the form of largely dried polymer strand to give dried polymer particles.

A comminutor provides the polymer particles with a residence time in the comminuting arrangement of not more than, and more likely significantly less than, a minute, more particularly below 30 sec. A comminutor comminutes the polymer particles to give mass-average particle diameters downstream of the comminutor of not less than, and more likely well above, 1 mm.

An arrangement of the second comminutor directly downstream of the first comminutor relative to the product flow direction means in the present context that the second comminutor follows the first comminutor, either free of internals or only with the interposition of a guiding means such as a product flow-directing deflecting means or a product flow-assembling conveying means, such as that of a conveying screw or the like.

The second comminutor is advantageously disposed in the direct vicinity of the first comminutor. In particular, the residence time of the polymer particles between the first and second comminutors is much smaller than the residence time of the polymer particles in the first or second comminutor. Here, the conveying screw may form an exception in that it serves only as a product flow-converging conveying means without itself acting as a comminutor. Hence the residence times between the first and second comminutors are in the region of below 5 sec, possibly even below 1 sec. This is the case especially when the second comminutor directly follows the first comminutor in a manner free from internals; in other words, in order to accommodate free-falling, precomminuted, dried polymer particles from the first comminutor, it is located directly below the first comminutor.

The residence times in the first comminutor and second comminutor are situated more particularly in the range from several seconds up to a maximum of 10 sec, more particularly between 1 sec and 5 sec.

The residence times in a conveying screw are generally below 60 sec. The residence times in the comminuting arrangement are well below 1.5 minutes.

The mass-average particle diameters after grinding tend to be in the range well below 1 mm, whereas the particle diameters after comminution tend to be in the range well above 1 mm. Accordingly, a comminutor is not a grinding tool or grinding mill.

Accordingly, in this application, there is a clear distinction between comminution and grinding on the basis of the function and the outcome. In particular, a comminutor is not a grinding mill.

A comminuting arrangement is preferably disposed directly downstream of the drier setup relative to the product flow direction, for comminuting the dried polymer gel to give dried polymer particles, and/or directly upstream of a conveying section, more particularly of an intake to a conveying section, preferably a pneumatic conveying facility, relative to the product flow direction.

A comminuting arrangement is disposed more particularly upstream of a grinding facility relative to the product flow direction. With preference the polymer particles are transported downstream of the comminuting arrangement, relative to the product flow direction, by means of a conveying facility, more particularly a pneumatic conveying facility, to a grinding facility; accordingly, the conveying section is advantageously located between the comminuting arrangement and the grinding facility.

The disposition of the first comminutor directly downstream of the drier setup relative to the product flow direction means in the present context that the first comminutor follows the drier setup, and is preferably connected to it, in a manner either free from internals or only with interposition of a guiding means such as a product flow-directing deflecting means or of a product flow-converging conveying means, such as that of a conveying screw or the like.

Accordingly, the comminuting arrangement is designed to operate directly on the dry cake and/or to receive and comminute the coarse crushed material and/or the coarse chunks from a dried polymer strand of the dry cake at the end of a conveying belt of a belt drier. Aside from deflecting plates, therefore, the comminuting arrangement serves for the direct first comminution of this dried polymer strand of the dry cake.

Here as well there is a significant difference relative to a grinding mill. While a comminutor is intended to serve—more in the earlier part of a product flow—to produce an initially comminuted and transportable, grindable product flow of polymer particles, a grinding mill—more in the later part of a product flow—serves to produce a polymer particle powder which is already amenable to processing. The fine dusts which occur during grinding in grinding mills are something to be avoided in the case of comminutors, since they are detrimental to the transportability of polymer particles.

Furthermore, the dropping of coarse crushed material or coarse chunks of dried polymer particles out of the comminuting arrangement is largely reduced. The reason is that the first comminutor can be optimized so that—apart from unavoidable exceptions—the dry cake directly, coarse crushed material or coarse chunks of the dry cake are also comminuted. The first comminutor carries out comminution initially to give the aforesaid coarsely comminuted dried polymer particles. The second comminutor comminutes these particles in turn to give the aforementioned well-comminuted or finely comminuted polymer particles. Their average particle size distribution is matched to the pneumatic conveying and/or to the requirements of a grinding facility.

The drier setup advantageously has a conveying belt for receiving aqueous polymer gel on the conveying belt and for conveying the polymer gel on the conveying belt in a conveying direction through the drier setup, and has a polymer gel intake and a polymer gel discharge. In particular, the drier setup has an air guiding facility, connected to the drier setup, for conveying incoming air and outgoing air for the drying of the aqueous polymer gel.

The comminuting arrangement is advantageously disposed downstream of a polymer gel discharge, relative to the product flow direction, for comminuting the dried polymer gel to give dried polymer particles; the dried polymer gel in the form of dry cake directly or of coarse crushed material or coarse chunks from a dried polymer strand of a dry cake of the polymer gel is supplied to the comminuting arrangement and comminuted to give dried polymer particles.

The comminuting arrangement is advantageously disposed upstream of a pneumatic conveying facility and/or upstream of a grinding facility relative to the product flow direction. This may relate to comminution which is designed to comminute polymer particles to a mass-average particle diameter of between 0.5-10 mm, preferably 1-9 mm, very preferably 1-5 mm. The mass-average particle diameter after comminution is determined according to EDANA Test Method No. WSP 220.2-05 "Particle Size Distribution". For the determination of particle size distribution, however, sieves with mesh sizes of 0.6/1/2/3.15/4/5/6.3/8/10/14/20 mm are used. The portions by mass of the sieve fractions are plotted cumulatively, and the mass-average particle diameter is determined graphically. The mass-average particle diameter in this context is the mesh size value obtained for a cumulative 50 wt % (see FIG. 7A).

Comminution preferably supplies a product stream of advantageously conveyable and subsequently grindable polymer particles.

The mass-average particle diameter of the polymer particles comminuted by the comminuting facility and, furthermore, ground by the grinding facility is preferably at least 200 μm, more preferably from 250 to 700 μm, very preferably from 300 to 600 μm. The mass-average particle diameter after grinding is determined in a similar way to the mass-average particle diameter after comminution. For determining the particle size distribution after grinding, however, sieves having mess sizes of 45/150/212/300/425/500/600/710/850 μm are used (see FIG. 7B).

The proportion of polymer particles having an average particle size of greater than 150 μm is preferably at least 90 wt %, more preferably at least 95 wt %, very preferably at least 98 wt %.

The development has recognized in particular, moreover, that the combination of a first comminutor with a second comminutor can be tailored more effectively to a distribution of coarse crushed material immediately downstream of the conveying belt, on the one hand, and on the other hand that the starting material of well-comminuted or finely comminuted, dried polymer particles, independently of this, can be tailored to the requirements of pneumatic conveying and/or of grinding.

Furthermore, the development makes use of the advantage that the comminuting arrangement is disposed preferably immediately after the polymer discharge at the end of the conveying belt and immediately downstream before the pneumatic conveying facility. In this way, the comminuting arrangement is accommodated in a space-saving way between the belt drier and the pneumatic conveying facility. Nevertheless, it can be operated independently of the belt drier, and, in particular, largely independently of the properties of the coarse crushed material—e.g., coarse chunks—of dried polymer particles, broken off from the dried polymer strand.

The second comminutor is preferably located alongside or below the first comminutor for receiving precomminuted dried polymer particles. In one particularly preferred development, the invention has recognized that the second comminutor in terms of location is placed directly below the first comminutor. As a result, the coarsely comminuted, dried polymer particles falling out from the first comminutor are able to fall directly, utilizing gravity, into the second comminutor. There is therefore no need for the coarsely comminuted polymer particles to be conveyed to the second comminutor by a facility which actively employs conveying means, such as pneumatic means or mechanical means. In particular, the second comminutor is placed directly below the first comminutor for receiving free-falling dried polymer particles from the first comminutor.

With particular advantage, the comminuting arrangement comprises a deflecting means, with the first comminutor of the comminuting arrangement being disposed downstream of the deflecting means relative to the product flow direction. A deflecting means may be utilized advantageously for deflecting the dried polymer strand and, even at this stage, for controlled breaking of coarse chunks from the polymer strand of the dry cake. This homogenizes the resulting coarse chunks and also prevents coarse chunks or parts thereof being guided past the comminuting arrangement. It is possible in particular to achieve a direction-specific orientation of the coarse chunks with respect to the first comminutor. With preference, the first comminutor is located below the deflecting means and/or for receiving crushed material of a dried polymer strand of dried polymer particles, with the deflecting means being aligned relative to the first comminutor in such a way that the crushed material of a dried polymer strand falls into the first comminutor.

A production process for producing water-absorbing polymer particles advantageously provides for the following steps:
  polymerizing an aqueous monomer solution or monomer suspension for producing an aqueous polymer gel,
  conveying the aqueous polymer gel to a belt drier arrangement,
  drying the aqueous polymer gel in the belt drier arrangement with a conveying belt (belt drier belt), by accommodating the aqueous polymer gel on the conveying belt and conveying the polymer gel on the conveying belt in a conveying direction, —comminuting and grinding the dried polymer gel to give water-absorbing polymer particles, where
  for the comminuting, at the polymer discharge, downstream of the polymer discharge in the product flow direction, there is a comminuting arrangement for comminuting a dry cake of dried polymer gel to give dried polymer particles, wherein
  the comminuting arrangement comprises at least a first comminutor and second comminutor each with a rotating roll, the second comminutor being disposed directly downstream of the first comminutor relative to the product flow direction, and below the first comminutor, and upstream of a pneumatic conveying facility and/or upstream of a grinding facility relative to the product flow direction.

The comminuting arrangement is preferably configured to comminute the dry cake of dried polymer gel to give dried polymer particles having an average particle size, specifically a mass-average particle diameter in a particle size distribution of the polymer particles, of—with particular preference—between 1 mm and 9 mm, preferably 1 mm to 5 mm.

The process and the belt drier with the comminuting arrangement and/or grinding facility are preferably robust toward temperature fluctuations. The belt drier and the process are preferably configured to comminute and/or to grind the polymer particles of the coarse chunks at a temperature at or above 40° C. The polymer particles ought more particularly to be comminuted at a temperature of between 40° C. and 140° C., very particularly between 60° C. and 120° C.

In particular, the first comminutor is configured as a milling comminutor, more particularly as a milling comminutor with support table. In particular, moreover, the second comminutor may in that case be configured as a crusher, more particularly as a cross-vane comminutor. A milling comminutor or other milling cutter has the advantage that it is able at any rate, with optimally established conditions of a dried polymer strand, to produce, even at this stage, comparatively randomly, finely comminuted polymer particles. Nevertheless, a milling comminutor is to be operated under optimal conditions.

Figure 2A:
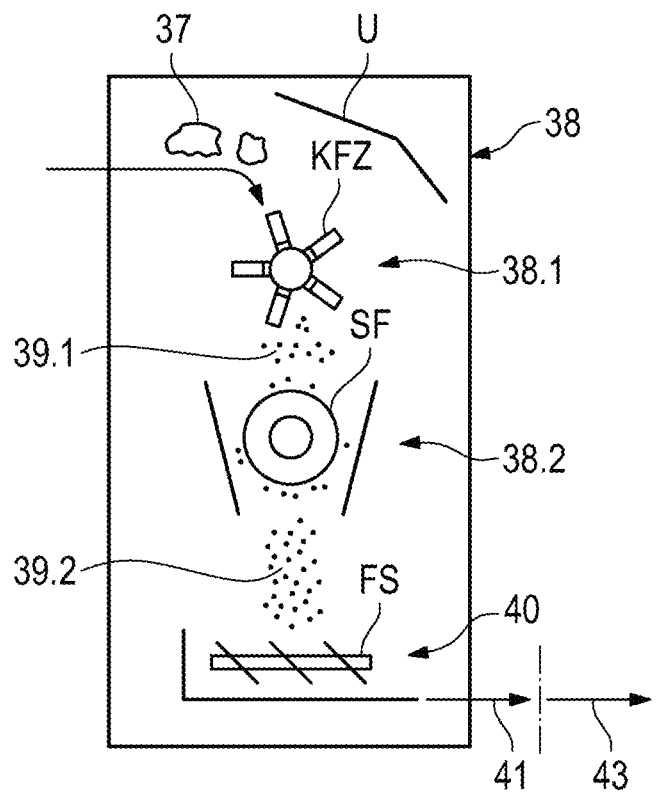

The first comminutor of the comminuting arrangement is preferably configured as a crusher, more particularly as a cross-vane comminutor. In particular, moreover, it is possible in that case for the second comminutor to be configured as a milling cutter. A crusher may take the form, for example, of a cross-vane comminutor or of another crusher, and is notable here for the fact that even quite coarse chunks can be comminuted sufficiently to give at any rate coarse dried polymer particles. As a first comminutor, a crusher may operate fairly robustly and is not necessarily reliant on optimal conditions. One merely exemplary embodiment of this development is shown in FIG. 2A.

In particular, in one variant, the second comminutor may be configured as a crusher, and preferably the first and second comminutors may be configured as a crusher. A crusher may take the form, for example, of a cross-vane comminutor or of another crusher. A crusher as second comminutor may operate more finely than a quite robustly operating crusher of the first comminutor. For example, a first comminutor may comprise a crusher in the form of a cross-vane comminutor, and a second comminutor may comprise a crusher in the form of a roll crusher. Between the first and second comminutors (see exemplary embodiment of this development, FIG. 2E) or after the second comminutor there may be a conveying section (see exemplary embodiment of this development, FIG. 2A, FIG. 2B).

Figure 2B:
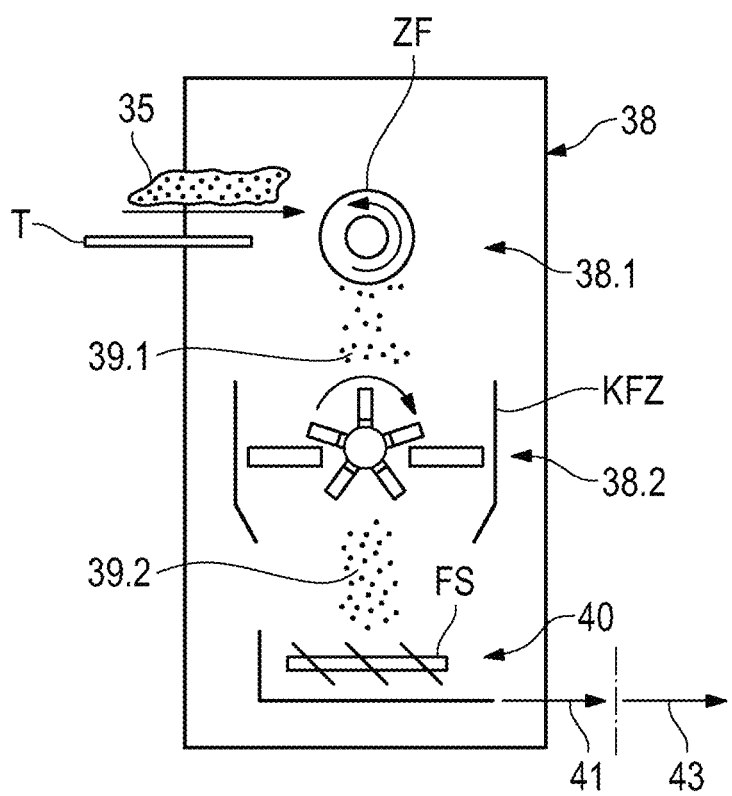
Figure 2C:
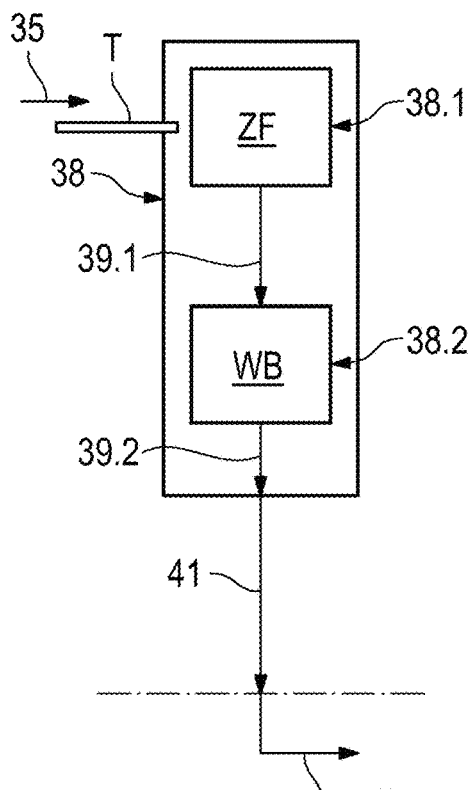

The second or third comminutor is preferably configured as a roll crusher or conveying screw. The second comminutor is preferably configured as a roll crusher, in particular after a first comminutor in the form of a milling cutter. An exemplary embodiment of this development is shown in FIG. 2C. In principle, the second comminutor as well may take the form of a milling cutter.

It has also proven advantageous for the first comminutor to be configured as a crusher and the second comminutor as a milling cutter. This first variant makes use of the advantage that a comparatively robustly operating crusher as first comminutor can be followed effectively by a milling comminutor, in order thus to furnish finely comminuted, dried polymer particles. An exemplary embodiment of this development is shown in FIG. 2A.

It has proven advantageous that in one variant, the first comminutor is configured as a milling comminutor and the second comminutor as a crusher, more particularly a cross-vane comminutor, a roll crusher, or as a comminuting conveying screw. The latter variant makes use of the advantage of a milling comminutor in producing polymer particles that are already largely smally comminuted. One merely exemplary embodiment of this development is shown in FIG. 2B, FIG. 2C and, FIG. 2D. With particular advantage, the second comminutor of the comminuting arrangement is disposed immediately upstream of the pneumatic conveying facility and/or upstream of the grinding facility relative to the product flow direction.

The comminuting arrangement advantageously comprises, as a third comminutor or else, on occasion, as a second comminutor (for example as in FIG. 2D), a—preferably comminuting—conveying screw. One merely exemplary embodiment of this development is shown in FIG. 2A and in FIG. 2B and in FIG. 2E.

The conveying screw functions advantageously as a second or third comminutor, advantageously directly downstream of a first comminutor or directly downstream of a second comminutor relative to the product flow direction. A conveying screw is advantageously disposed directly below the second comminutor (for example as in FIG. 2A, FIG. 2B) to receive free-falling dried polymer particles. Additionally or alternatively, a conveying screw is advantageously disposed directly below the first comminutor (for example as in FIG. 2E) to receive free-falling dried polymer particles. The fine comminuted polymer particles falling from the second comminutor may fall directly into the third comminutor.

The principal function of the conveying screw is that of product guidance, and it is capable of converging the product stream from a two-dimensional arrangement—such as after a comminutor—into a one-dimensional product stream; accordingly, a conveying screw is initially suitable advantageously for introducing the product stream of polymer particles into an intake of a further unit, such as a conveying section, or a further comminutor.

Provided advantageously is a cross-vane comminutor having a rotatable shaft with functional rods and a fixed rod grid disposed directly opposite the shaft. In particular, the rotatable functional rods of the rotatable shaft may engage into interstices between fixed crushing rods of the rod grid, in order to comminute the dry cake of dried polymer gel. An axial gap between a functional rod and a crushing rod is advantageously smaller than two times the axial width of the functional rod and/or than two times the axial width of the crushing rod, and/or the axial gap is smaller than 20 mm, and more particularly it is between 8 mm to 12 mm.

The crushing rods advantageously have an axial spacing of not more than five times a thickness in the case of functional rods, more particularly not more than four times or three times a thickness of the functional rods.

Additionally or alternatively, the functional rods and/or the crushing rods may have a length of not more than twice the diameter of the shaft. In particular, the functional rods and/or crushing rods have a length of not more than twice, more particularly once, the diameter of the shaft.

An axial gap between a functional rod and a crushing rod is advantageously smaller than twice the axial width of the functional rod and/or crushing rod, and/or a functional rod and crushing rod may be equal in thickness. This has advantages in the distribution of force along the shaft. The working line is advantageously spiral along the shaft; this has proven advantageous for a distribution of force along the shaft.

Advantageously
 a comminutor is configured for rotating the shaft with a rotational velocity of more than 50 rpm and less than 250 rpm, and/or
 a crusher is configured for rotating the shaft with a rotational velocity of more than 50 rpm, and/or
 a milling cutter is configured for rotating the shaft with a rotational velocity of more than 50 rpm.

A milling cutter is preferably configured as a rotatable shaft with at least one functional element which is configured for milling off dried polymer particles directly from the dry cake and/or from the polymer strand of the dried polymer strand of the dry cake; more particularly, the functional element is configured with a working edge which follows a helix, and more particularly the functional element is configured with a helical web having a jagged notch or with a helical sequence of vane end faces. The helix preferably has a single flight or two or more counter-directional flights.

With preference the milling cutter has a rotatable shaft with at least one functional rod or other functional tools that are configured for milling dried polymer particles directly from the dry cake. A number of functional rods or other functional tools are preferably disposed along a working edge which follows a helix. The helix may more particularly have a pitch angle relative to a cross-sectional surface that is between 20° to 70°.

Preferably the first comminutor is equipped with an upper working edge. More particularly the upper working edge in the case of a crusher may be disposed at the height or below the height of a receiving surface of the conveying belt for receiving the ejection of the dry cake.

Alternatively, the first comminutor is configured as a milling cutter and the upper working edge of the milling cutter is disposed at the height or above the height of a receiving surface of the conveying belt, for milling the dry cake and supporting the downward ejection of the dry cake.

Working examples of the invention are now described below with reference to the drawing. This drawing is not necessarily intended to represent the working examples to scale; instead, the drawing, useful for elucidation, is executed in schematized and/or slightly distorted form. With regard to supplements to the teachings directly apparent from the drawings, reference is made to the relevant prior art. It should be taken into account here that various modifications and alterations relating to the form and the detail of an embodiment can be undertaken without departing from the general idea and the concept of the invention. The features of the invention that are disclosed in the description, in the drawing and in the claims may be essential, both individually and in any desired combination, to the development of the invention. Moreover, the scope of the invention includes all combinations of at least two of the features disclosed in the description, the drawing and/or the claims.

The general idea and the concept of the invention is not restricted to the exact form or the detail of the preferred embodiments shown and described below, or restricted to subject matter that would be limited compared to the subject matter claimed in the claims. Where ranges of dimensions are given, any values within the limits stated shall also be disclosed as limiting values and shall be usable and claimable as desired. Further advantages, features and details of the invention will be apparent from the description hereinafter, from the preferred working examples, and from the drawing.

Figure 3A:
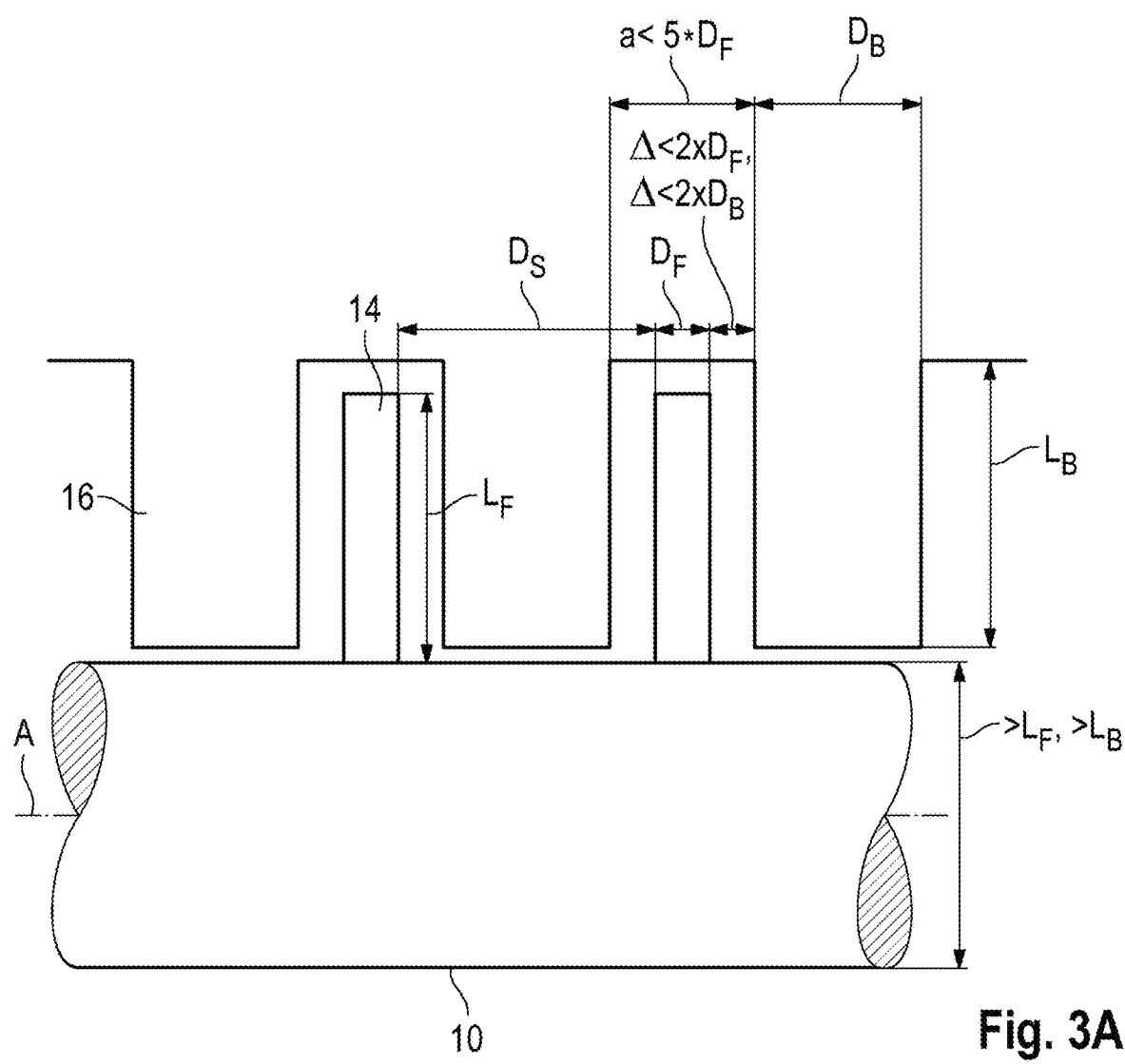
Figure 3B:
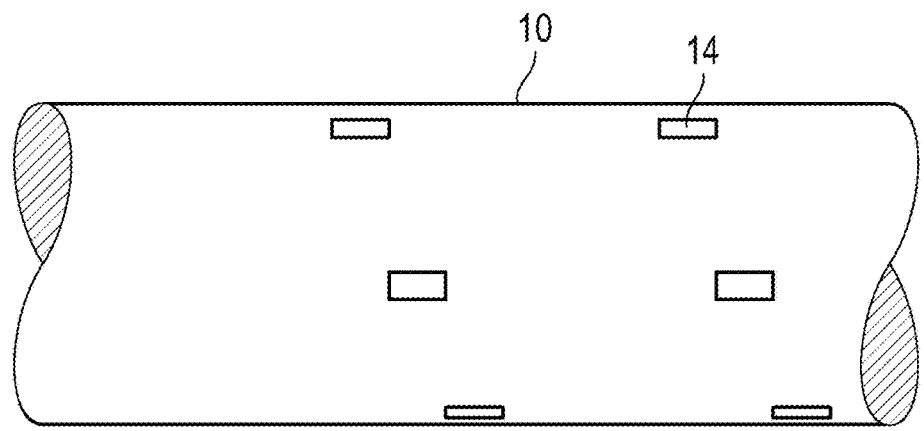
Figure 4A:
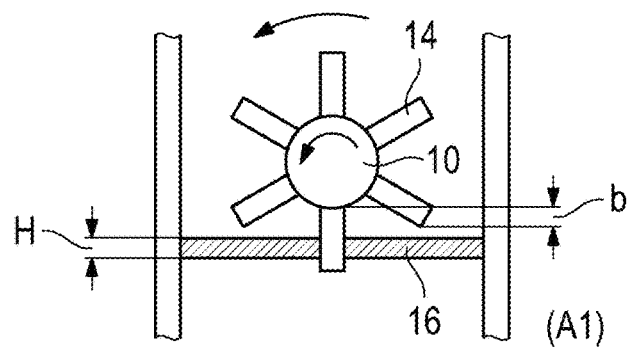
Figure 4A:
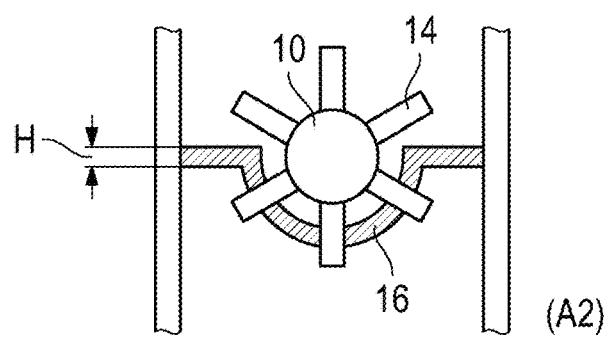
Figure 4A:
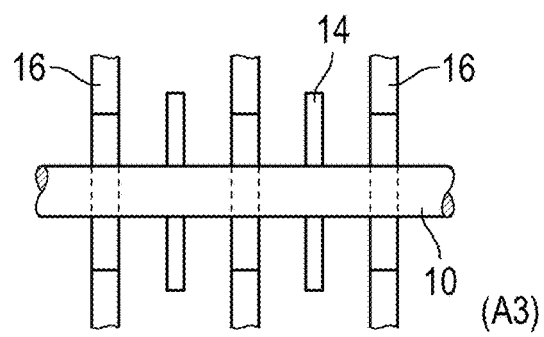
Figure 4A:
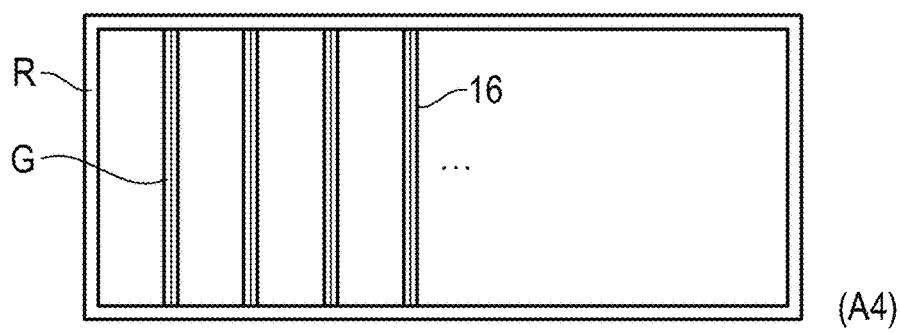
Figure 4B:
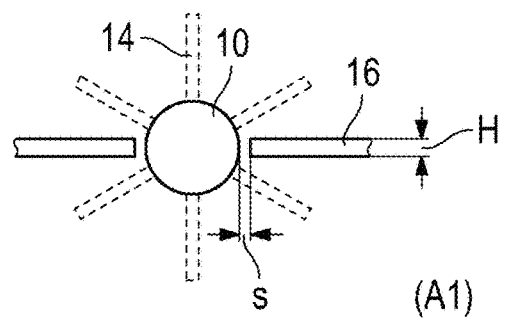
Figure 4B:
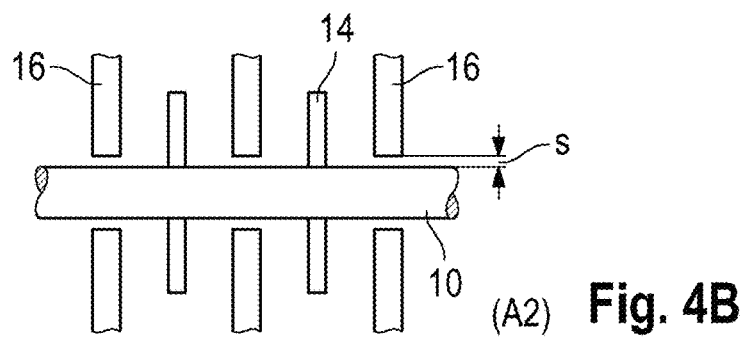
Figure 5A:
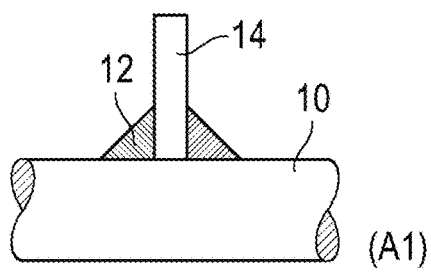
Figure 5A:
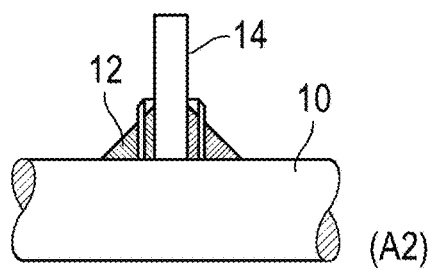
Figure 5A:
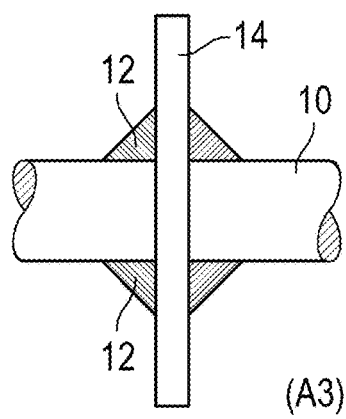
Figure 5B:
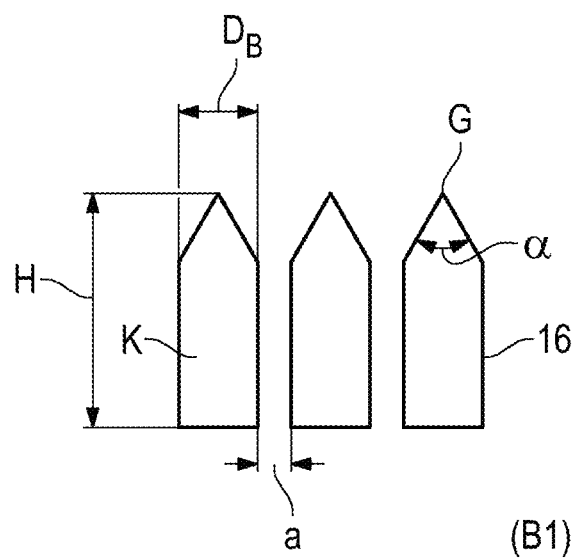
Figure 5B:
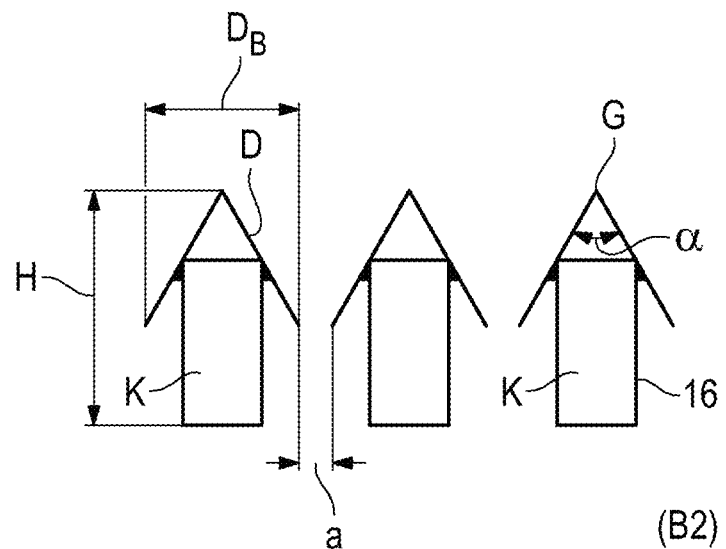
Figure 6A:
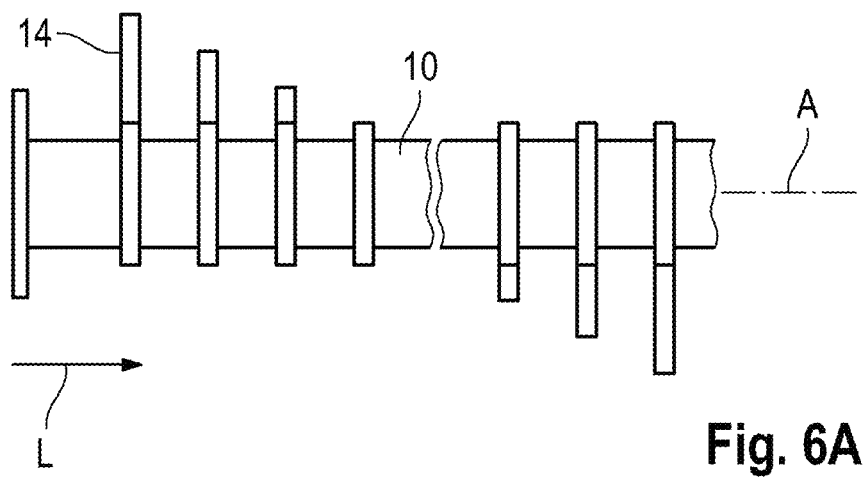
Figure 6B:
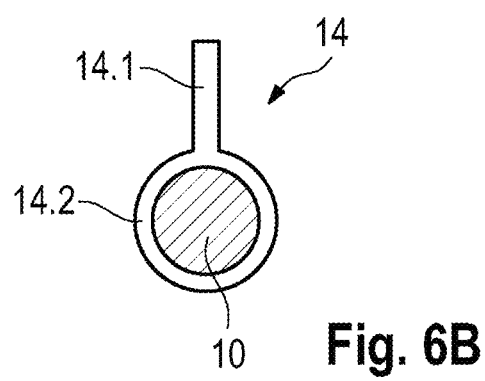

Specifically, the drawing shows in:

FIG. 1 a schematic representation of a production arrangement for producing water-absorbing polymer particles, comprising a belt drier and a comminuting arrangement downstream of the belt drier for comminuting a dry cake of dried polymer gel to give dried polymer particles, from the belt drier in product flow direction and upstream of a pneumatic conveying facility and upstream of a grinding facility relative to the product flow direction;

FIG. 2A, FIG. 2B, FIG. 2C, FIG. 2D, FIG. 2E schematically represented variants of the comminuting arrangement of FIG. 1
  having three comminutors in the comminuting arrangement:
  in 2A: cross-vane comminutor, cutting mill, conveying screw
  in 2B: milling comminutor with table for dry cake, cross-vane comminutor, conveying screw;
  having two comminutors in the comminuting arrangement:
  in 2C: milling comminutor with table for dry cake, roll crusher,
  in 2D: milling comminutor with table for dry cake, conveying screw;
  having three comminutors in the comminuting arrangement:
  in 2E: cross-vane comminutor, conveying screw, roll crusher;

FIG. 3A, FIG. 3B a scheme of a crusher in the form of a cross-vane comminutor having a rotatable shaft with functional rods
  in 3A: in a plan view with spacing values indicated, and
  in 3B: in a perspective view, the shaft, with a schematic representation of an arrangement of rods or bars that rotate with one another;

FIG. 4A, FIG. 4B two variants of a crusher, in each case in the form of a cross-vane comminutor having a rotatable shaft with functional rods of a crusher
  in 4A: with a continuous rod lattice of solid rods, fastened on either side of the shaft, specifically
  a first modification in view (A1), a second modification in view (A2), a top view for the second modification in view (A3), the rod lattice with frame in view (A4);
  in 4B: with an interrupted rod lattice of solid rods, fastened on one side of the shaft, specifically
  a first modification in view (A1), a top view for the first modification in view (A2);

FIG. 5A, FIG. 5B in 5A: details of a rotatable shaft having functional rods of a crusher in the form of a cross-vane comminutor in three modifications (A1), (A2) and (A3);
  in 5B: details of a rod lattice of FIG. 4A or FIG. 4B having fixed crushing rods in the case of the cross-vane comminutor, in two modifications (B1), (B2);

FIG. 6A, FIG. 6B details of a rotatable shaft having functional rods in the form of bars; these rods may be configured as a milling cutter for milling dried polymer particles directly from the dry cake,
  in 6A: in a perspective view;
  in 6B: in an enlargement with a side view of a functional rod;

FIG. 7A, FIG. 7B a cumulative plot of proportions by mass of the sieve fractions for graphical determination of the mass-average particle diameter after (FIG. 7A) comminution and (FIG. 7B) grinding, especially for illustrating a similar procedure for determining the mass-average particle diameters after grinding, on the basis of three examples.

In the drawing, for the sake of simplicity, the same reference symbols have been utilized for identical or similar parts or for parts with identical or similar function.

A production process for SAPs comprises for example the following steps:
  processing a monomer solution or suspension with polymerization to give an aqueous polymer gel,
  drying the aqueous polymer gel in a belt drier, where the belt drier has a circulating conveyor belt and the aqueous polymer gel is conveyed on the conveyor belt.

It is preferably the case here that
  the conveyor belt takes the form of a plate conveyor belt having a number of belt plates which are separated on an articulated line of an articulated construction, and where each belt plate has a surface for receiving the aqueous polymer gel.

This production process may more particularly comprise: processing a monomer solution or suspension with polymerization to give a crosslinked aqueous polymer gel.

In the context of one particularly preferred development it has been recognized that the concept of the invention or of one of the developments thereof is particularly advantageous for a specific production process for superabsorbents, especially for a specific production process for a polymer gel for superabsorbents, which is described hereinafter with a few developments and is partly also elucidated in WO2011/104152 and WO2006/100300 A1, the disclosure content of which is hereby incorporated by reference into the disclosure content of the present application.

More particularly, this relates to a production process for producing water-absorbing polymer particles by polymerization of a monomer solution or monomer suspension comprising
  a) at least one ethylenically unsaturated monomer which bears acid groups and may have been at least partly neutralized,
  b) at least one crosslinker,
  c) at least one initiator,
  d) optionally one or more ethylenically unsaturated monomers copolymerizable with the monomers stated under a), and
optionally one or more water-soluble polymers.

The water-absorbing polymer particles are produced by polymerization of a monomer solution or suspension and are water-insoluble.

The aqueous polymer gel is then preferably dried with a belt drier until a desired, preferably low, water content is established, especially insofar as a residual moisture content is preferably 0.5% to 15% by weight, more preferably 1% to 10% by weight, very preferably 2% to 8% by weight, the residual moisture content being determined by EDANA recommended Test Method No. WSP 230.2-05 "Mass Loss Upon Heating". If the residual moisture content is too high, the glass transition temperature, Tg, of the dried polymer gel is too low and the gel can be processed further only with difficulty. In the case of too low a residual moisture content, the dried polymer gel is too brittle and, in the subsequent comminution steps, undesirably large amounts of polymer particles with an excessively low particle size are obtained ("fines"). The solids content of the gel before drying is preferably from 25% and 90% by weight, more preferably from 35 to 70% by weight, very preferably from 40 to 60% by weight. However, a fluidized bed drier or a paddle drier may also be used, alternatively, for drying purposes.

The dried polymer gel is conveyed pneumatically, ground, and classified. The grinding may be carried out using single-stage or multistage roll mills, preferably two- or three-stage roll mills, pin mills, hammer mills or vibratory mills.

FIG. 1 shows a schematic representation of a production process for poly(meth)acrylates, i.e., generally, SAPs. The schematic representation in FIG. 1 shows the course of a production process for poly(meth)acrylates up to the point of dried polymer particles.

The reactants 31 for producing the poly(meth)acrylates are introduced for example into a mixer-compounder, belt reactor or other reactor 30. The mixer-compounder comprises, for example, two axially parallel, rotating shafts, the surfaces of which house disk areas having kneading bars disposed at their periphery. In a polymerization reaction, a poly(meth)acrylate product is generated, which departs the reactor 30 in the form of lumps 33 of gellike consistency. The lumps 33 enter a gel bunker 32, from which the lumps are applied, using a pivot belt or similar conveying means 34, to a conveying belt (not shown) of a belt drier 36—they are therefore applied in the form of a superabsorbent polymer in the state of an aqueous polymer gel of still-aqueous polymer gel particles 33. The belt drier 36 removes liquid from the aqueous polymer gel particles on the conveying belt at a temperature of up to 200° C., and so they are conveyed through the belt drier on the conveying belt in the form of partly dried, i.e., still moist, polymer gel particles.

The dried poly(meth)acrylate chunks enter in the form of dried polymer gel particles of a boardlike, solid dry cake 35 at the exit of the belt drier. The dry cake 35 subsequently enters a comminuting arrangement 38. In general, the dry cake 35 breaks at the end of the conveying belt, and then coarse fragments or chunks 37 pass subsequently into a comminuting arrangement 38. Where the dry cake 35 manages to reach a milling cutter of a comminuting arrangement 38 without breaking, i.e., still whole, comminuted polymer particles are milled off directly from the dry cake 35. In principle, however, fragments of the dry cake 35 or other large chunks 37 may also be destructively milled by the milling cutter to give comminuted polymer particles.

Instead of a comminuting arrangement, provision is made, in accordance with WO2013/072419, for example, of just one comminutor, implemented in the form of a cross-vane comminutor.

A cross-vane comminutor comprises, for example, a shaft 10, which accommodates a multiplicity of functional rods 14. The functional rods 14 are welded to the shaft 10.

Besides the functional rods 14 disposed on the shaft 10, the cross-vane comminutor comprises a multiplicity of fixedly mounted bars, which engage into interstices of the functional rods 14 disposed on the shaft. The poly(meth)acrylate chunks of dried polymer particles of the dry cake that are introduced into the comminutor fall onto the fixedly mounted bars, where they remain lying. The chunks are broken apart by the functional rods 14, which rotate along with the shaft 10. After having passed through the cross-vane comminutor, the coarsely comminuted dried polymer particles are supplied via a pneumatic transport system to a grinding facility or the like with a grinding mill, for example. There, the poly(meth)acrylate particles are destructively milled further until the product is obtained in the form of a powder.

A problem with this form of plant, however, despite it being comparatively simple and efficient in design, is that with only one cross-vane comminutor there may be a lack of sufficiently fine comminution of the cake 35 and/or the fragments 37 by means of the single cross-vane comminutor. Indeed, depending on the product to be dried and on the drying conditions and the throughput of the belt drier, the dry cake 35 may well differ in hardness. Depending on the dimensions selected, therefore, a single cross-vane comminutor may possibly not be sufficient to provide finely comminuted fragments. These fragments, for example, could fall between the bars of the cross-vane comminutor, if the spacing range selected is too large, or they might simply remain lying on the comminutor. Both cases prove to be disadvantageous for the operation of the plant.

Particularly in the event that excessively coarse chunks enter the pneumatic transport system, this could lead to transport problems. In particular, excessively coarse chunks could not be processed advantageously, or not taken in at all, by the grinding facility provided in the further conveying region.

Consequently, the comminuting arrangement 38 of FIG. 1—with at least one first and one second comminutor 38.1, 38.2—ensures that initially coarsely comminuted chunks from the first comminutor are sufficiently finely comminuted in the second comminutor in order to be conveyable by the pneumatic transport system and to be readily grindable by a grinding mill. The details of a comminuting arrangement 38 of FIG. 1 are elucidated again in detail in relation to the further FIG. 2 to FIG. 6.

In the present case, dried polymer particles—in other words, chunks comminuted sufficiently for pneumatic conveying and for a grinding procedure, and also unavoidable crush residues, which here are provided collectively with the reference symbol 39—are optionally supplied to a conveying and/or homogenizing means, optionally to a third comminutor 40, which preferably homogenizes the main stream of the product; this means may be, for example, a conveying screw FS or the like.

The dried polymer particles of the main stream 41, which are therefore well-comminuted and well-homogenized, are then supplied to a pneumatic conveying facility 42, and these sufficiently comminuted polymer particles in the homogenized product stream of the pneumatic conveying facility are identified by the reference symbol 43. These dried polymer particles 43 are then fed to a grinding facility 44 with a grinding mill for a grinding operation, where they are ground, and they enter a sieving apparatus 46 as ground, dried polymer particles 45. After the sieving apparatus 46, the sieved, ground, and dried polymer particles 47, with the product fraction having a desired particle size distribution, leave the sieving apparatus, and these sieved, ground, and dried polymer particles 47 are passed on optionally for further treatment, such as surface postcrosslinking, and also a subsequent drying operation or other thermal treatment process, and, after safeguard sieving, they are made available as a product. Any fractions with oversize after the sieving apparatus 46 may be supplied again for grinding 44 in the grinding mill, until they have a desired product-fraction particle size distribution.

The fraction of polymer particles having a particle size of greater than 150 μm is preferably at least 90% by weight, more preferably at least 95% by weight, very preferably at least 98% by weight.

Polymer particles with too low a particle size lower the permeability (corresponding to a SFC value as a measure of the permeability of fluid between polymer particles; for the measurement method, for example, see EP 0 752 892 B1 pp. 33-36 [0224]-[0251]. The fraction of polymer particles which are too small ("fines") ought therefore to be low.

Polymer particles that are too small are therefore separated off and recycled to the production process. Recycling takes place preferably before, during or immediately after the polymerization, i.e., before the drying of the polymer gel. Before or during the recycling, the polymer particles that are too small may be moistened with water and/or with aqueous surfactant.

It is also possible to remove excessively small polymer particles in later production process steps, for example after the surface postcrosslinking or another coating step. In this case, the excessively small polymer particles recycled are surface postcrosslinked or coated in another way, for example with fumed silica.

If a kneading reactor is used for the polymerization, the excessively small polymer particles are preferably added in the last third of the kneading reactor.

If the excessively small polymer particles are added at a very early stage, for example actually to the monomer solution, this lowers the centrifuge retention capacity (corresponding to a CRC value) as a measure of the water absorption capacity; measurement analogous to ISO 17109-6:2001) of the resulting water-absorbent polymer particles. This can be compensated, though, for example by adjusting the amount of crosslinker b) used. The excessively small polymer particles may also be added at a later stage, but could then possibly be incorporated only inadequately.

Inadequately incorporated, excessively small polymer particles are, however, detached again from the dried polymer gel during grinding, and are therefore removed again in the course of classification, and increase the amount of excessively small polymer particles to be recycled.

The proportion of particles having a particle size of at most 850 μm is preferably at least 90% by weight, more preferably at least 95% by weight, very preferably at least 98% by weight. Alternatively, the proportion of particles having a particle size of at most 600 μm is preferably at least 90% by weight, more preferably at least 95% by weight, very preferably at least 98% by weight. Polymer particles with too great a particle size lower the swell rate. The proportion of excessively large polymer particles should therefore likewise be low. Excessively large polymer particles are therefore removed and recycled to the grinding of the dried polymer gel.

In accordance with the concept of the invention, in relation to the above-described FIG. 1, preferred comminuting arrangements are described below, with reference to FIG. 2 ff., these arrangements comminuting the dried polymer gel as a polymer strand after drying or after a belt drier, in an improved way, to give dried polymer particles, this comminution taking place at any rate to a mass-average particle diameters well above 1 mm. Within the improved comminuting process for the dried polymer gel as a polymer strand, the intention in particular is to comminute the dried polymer particles with a particle size suitable for or intended for subsequent pneumatic conveying and/or grinding.

FIG. 2 in views (A) to (E) shows preferred embodiments of the combination of a comminuting arrangement 38 with a first comminutor 38.1 and a second comminutor 38.2 and also, optionally, a conveying screw FS or another conveying and/or homogenizing means, which may optionally also serve as a third comminutor for the further comminution and homogenization of the product flow.

Figure 2D:
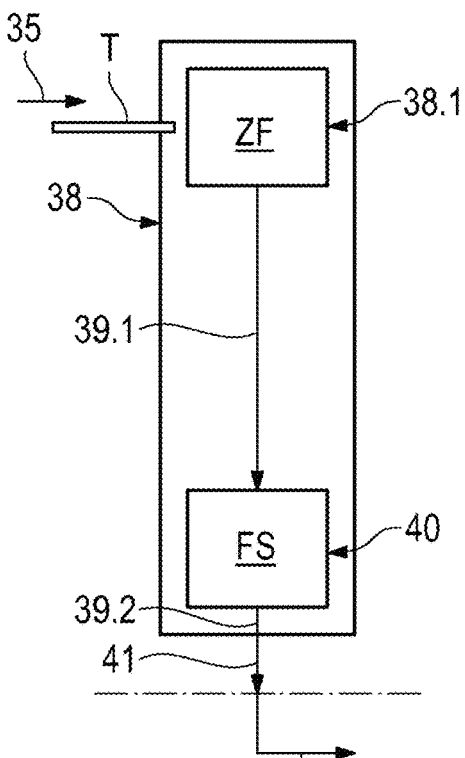
Figure 2E:
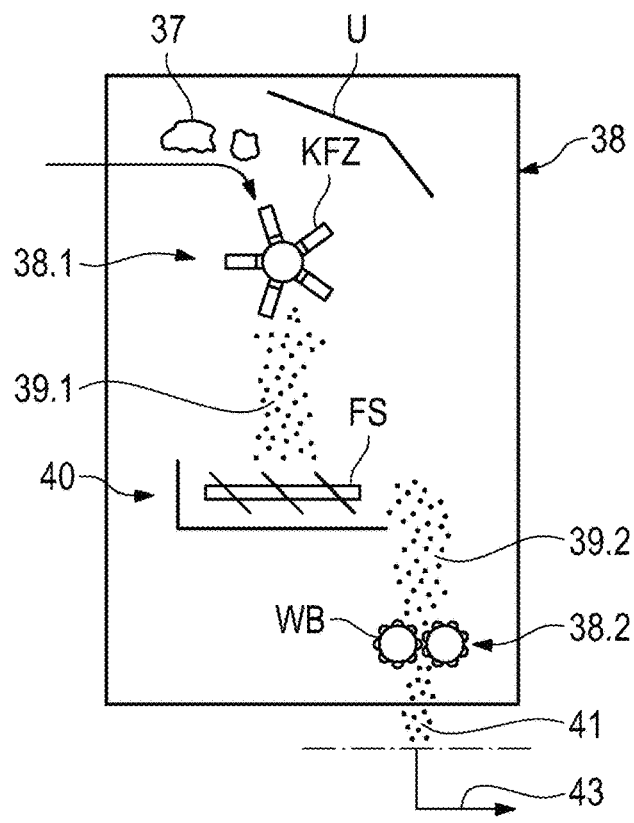

FIG. 2A and FIG. 2B and FIG. 2E accordingly show first a comminuting arrangement 38 with a first comminutor 38.1, a second comminutor 38.2 and a conveying screw FS as conveying and/or homogenizing means 40. The comminuting arrangement presently comprises optionally, basically, three comminutors, for the case where the conveying screw FS here is designed not only for homogenizing but also, additionally, for carrying out further comminution of the dried polymer particles.

FIG. 2C shows a comminuting arrangement 38 only with a first comminutor 38.1 and a second comminutor 38.2; in other words, here, in particular, there is no conveying screw.

FIG. 2D shows a comminuting arrangement 38 only with a first comminutor 38.1 and a conveying screw FS as conveying and/or homogenizing means 40, this screw being designed, moreover, for the further comminution of the dried polymer particles from the first comminutor, and hence as a second comminutor 38.2.

Referring first of all to FIG. 2A, this figure, as part of the comminuting arrangement 38—for the consequently three-stage comminution of the crushed material 37 of the dry cake 35 of dried polymer particles—shows a first comminutor 38.1 in the form of a cross-vane comminutor (also referred to as a pinkicker or rod crusher or other crushing grinding mill or spiked roll) with a deflecting means U. The comminuting arrangement 38 additionally has a second comminutor 38.2 in the form of a milling cutter SF. The comminuting arrangement 38, moreover, has a conveying screw FS which is designed for further comminution and which, as a conveying and/or homogenizing means 40, serves also to homogenize the product flow.

In the embodiment of FIG. 2A, the dried polymer particles 37 of the dried polymer strand of the dry cake 35 pass as crushed material onto the first comminutor 38.1, which they leave in the form of coarsely comminuted chunks 39.1 of dried polymer particles. The coarse chunks 39.1 of the dried polymer particles enter a milling cutter SF as second comminutor 38.2, where they are comminuted further to give finer chunks 39.2. The finer chunks 39.2 of the dried polymer particles fall finally into the conveying screw FS as conveying and/or homogenizing means 40, and are conveyed by the conveying operation to form a homogenized flow of finely comminuted polymer particles 41. These finely comminuted and sufficiently homogenized, dried polymer particles 41 then pass in the form of product flow 43 into the pneumatic conveying facility.

FIG. 2B shows a further embodiment of a comminuting arrangement 38 with a first comminutor 38.1 in the form of a milling cutter, milling roll or other milling comminutor ZF. If the dry cake 35 reaches the milling comminutor ZF of the comminuting arrangement 38 without breaking, in other words as a whole, comminuted polymer particles are milled off directly from the dry cake 35. In principle, however, it is also possible for fragments of the dry cake 35 or other coarse chunks 37 to be milled by the milling comminutor ZF to give comminuted polymer particles. Accordingly, the dry cake 35 and/or coarse chunks 37 are milled to comminuted polymer particles in the milling comminutor ZF of the first comminutor 38.1, and hence are already very finely comminuted, and leave the milling comminutor ZF in the form of comminuted, dried polymer particles 39.1. In order as far as possible for the dry cake 35 to reach the milling comminutor ZF of the comminuting arrangement 38 without breaking, in other words as a whole, a table T or other support is presently provided, which supports the dry cake 35 in a notional prolongation of the conveying belt and which guides this cake without breaking to the milling comminutor ZF.

Nevertheless, even with a milling comminutor ZF of this kind, depending on the nature of the dry cake 35, it is impossible to rule out in principle the entry of coarse chunks alongside the milling comminutor ZF as well or to rule out differential comminution by the milling comminutor, depending on the hardness of the dry cake 35 and hence the consistency of the dry cake 35 or of the coarse chunks 37.

In the product stream of polymer particles 39.1, milled and therefore already fairly finely comminuted polymer particles, there may also be inadequately comminuted polymer particles. These particles may arrive together, as a provisionally comminuted product flow of polymer particles 39.1, at the second comminutor 38.2. The second comminutor 38.2 is implemented here in the form of a cross-vane comminutor (alternatively pinkicker, rod crusher or spiked roll). The finely comminuted polymer particles 39.2 therefore arise from the smaller polymer particles already present at the entry of the second comminutor 38.2 and also from the still relatively coarse polymer particles, identified collectively by 39.1.

The therefore finely comminuted dried polymer particles 39.2 then pass to the conveying screw FS; the conveying screw FS, as a conveying and/or homogenizing means 40, is designed not only for homogenizing but also for additionally comminuting the dried polymer particles 39.2. At the end of the conveying screw FS, therefore, there is a product flow of sufficiently finely comminuted and homogenized dried polymer particles 41, this product flow as such then being delivered, as sufficiently comminuted and homogenized polymer particles 43, to the pneumatic conveying facility.

FIG. 2C shows a third embodiment of a comminuting arrangement 38 with merely a first comminutor 38.1 in the form of a milling comminutor ZF, and a second comminutor 38.2 in the form of a roll crusher WB. If the dry cake 35 reaches the milling comminutor ZF of the comminuting arrangement 38 without breaking, in other words as a whole, comminuted polymer particles are milled off directly from the dry cake 35. In principle, however, it is also possible for fragments of the dry cake 35 or other coarse chunks 47 to be milled by the milling comminutor ZF to give comminuted polymer particles. Accordingly, the dry cake 35 and/or coarse chunks 37 are milled to comminuted polymer particles in the milling comminutor ZF of the first comminutor 38.1, and hence are already very finely comminuted, and leave the milling comminutor ZF in the form of comminuted, dried polymer particles 39.1.

In order as far as possible for the dry cake 35 to reach the milling comminutor ZF of the comminuting arrangement 38 without breaking, in other words as a whole, a table T or other support is presently also provided here, which supports the dry cake 35 in a notional prolongation of the conveying belt and which guides this cake without breaking to the milling comminutor ZF.

The dry cake 35 as a whole and/or, optionally, coarse chunks 37 of the dried polymer strand of the dry cake 35 therefore first enter the milling comminutor ZF, which they leave in the form of comminuted polymer particles 39.1. These initially comminuted polymer particles 39.1 pass into a roll crusher WB, which they leave in the form of finely comminuted polymer particles 39.2.

Optionally, here as well, a conveying screw FS, as conveying and/or homogenizing means 40, may act as a third comminutor. At any rate, the product flow of finely comminuted polymer particles 39.2 is homogenized, and so a product flow of finely comminuted and homogenized dried polymer particles 41 leaves the conveying screw FS and is fed as comminuted, dried polymer particles 43 into the pneumatic conveying facility 42.

It is found that with this use of a roll crusher WB, the product flow of finely comminuted polymer particles 39.2 is already sufficiently homogenized. Advantageously, this particle flow of sufficiently homogenized, finely comminuted, dried polymer particles 39.2 can be introduced as it is into the pneumatic conveying facility 42, in other words without a conveying screw. The combination of a milling comminutor as first comminutor with a roll crusher as second comminutor results in a comminuting arrangement 38 having two comminutors for a sufficiently finely comminuted and homogenized product flow of dried polymer particles 41 for pneumatic conveying 42 and subsequent grinding 44.

FIG. 2D shows a fourth embodiment of a comminuting arrangement 38 with a milling comminutor ZF as first comminutor 38.1—here analogous, for example, to the embodiment of FIG. 2C for a resultant product flow of dried polymer particles 39.1 that is already fairly well comminuted. These particles enter a conveying screw FS with comminuting effect, as conveying and/or homogenizing means 40, where they are further comminuted again, and the product stream is also homogenized in the conveying screw 40. Departing again from the comminuting arrangement, therefore, is a sufficiently homogenized product flow of sufficiently finely comminuted, dried polymer particles 41, which enters a pneumatic conveying facility 42 and subsequent grinding facility 44. In the pneumatic conveying facility 42, the product flow of polymer particles is identified by 43. This comminuting arrangement, which is comparatively simple in construction, makes advantageous use of the fact that the conveying screw not only is a homogenizing means but also acts, moreover, as a comminuting means.

Referring to FIG. 2E, this figure, as part of the comminuting arrangement 38—for the consequently three-stage comminution of the crushed material 37 of the dry cake 35 of dried polymer particles—shows a first comminutor 38.1 in the form of a cross-vane comminutor (also referred to as a pinkicker or rod crusher or other crushing grinding mill or spiked roll) with a deflecting means U. The comminuting arrangement 38 also has a conveying screw FS, which, as a conveying and/or homogenizing means 40, may optionally also serve as a further comminutor, but which at any rate homogenizes the product flow 39.1 of polymer particles and provides it as a product flow 39.2 of polymer particles. This product flow 39.2, which is already sufficiently homogenized, is received by a second comminutor 38.2 in the form of a roll crusher WB. The product stream 41 of finely comminuted polymer particles after the roll crusher WB is certainly sufficiently homogenized now. It may be introduced advantageously into a grinding facility 44 by means of the pneumatic conveying facility 42, in the form of a particle flow 43 of sufficiently homogenized, finely comminuted, dried polymer particles.

The above-described embodiments of FIG. 1 to FIG. 2E all envisage that, even in the event of changeable properties on the part of the dried polymer strand of a dry cake 35, and even in the case of nonoptimized geometry of a crusher or of a milling comminutor ZF, there is a sufficiently finely comminuted flow of dried polymer particles 39 or 39.2 for pneumatic conveying 42 and for grinding 44, which can be supplied thereto as a homogenized, finely comminuted flow of dried polymer particles 43.

The relative arrangement of first and second comminutors 38.1, 38.2 envisaged for this purpose can in principle be realized in a variety of ways. It has nevertheless emerged that it is advantageous for the comminuting arrangement to comprise at least a first comminutor and a second comminutor, each having a rotating roll (including in each case a crusher, a milling cutter or a conveying screw or else, in the case of two rotating rolls, a roll crusher in particular).

In terms of the geometric arrangement it has proven advantageous for the second comminutor, relative to the product flow, to be disposed directly downstream of the first comminutor relative to the product flow direction; in other words, the coarsely comminuted polymer particles 39.1 arriving from the first comminutor pass directly into the second comminutor. In principle, the already coarsely comminuted, dried polymer particles 39.1 can be conveyed to this point, by pneumatic or mechanical means, for instance. However, it has proven particularly advantageous and effective for compact construction if the second comminutor is sited beneath the first comminutor. The second comminutor, moreover, is disposed upstream of the pneumatic conveying facility in the product flow direction, optionally with interposition of a third comminuting facility. Consequently, a grinding facility which is generally located downstream of the pneumatic conveying facility is sufficiently ensured of a supply thereto of a sufficiently finely comminuted and homogenized product flow of dried polymer particles, even in the event of variable qualities of the dried polymer strand of a dry cake 35 and, consequently, of the coarse chunks 37 downstream of a belt drier 36 and upstream of the comminuting arrangement 38. The location of the second comminutor directly below the first comminutor makes advantageous use of gravity, and so the coarsely comminuted polymer particles 39.1 are able to fall directly into the second comminutor 38.2.

Accordingly, the embodiment of FIG. 2E represents a modification of this principle, since the conveying screw FS receives the product flow 39.1 of polymer particles and displaces this flow laterally in such a way that the second comminutor 38.2 is located alongside the first comminutor 38.1 for receiving precomminuted dried polymer particles.

Furthermore, it has also proven advantageous to give particularly advantageous dimensions to a crusher for optional use in the comminuting arrangement 38, more particularly a crusher as first comminutor. It is found that the role of a crusher, as for example of a cross-vane comminutor, as first comminutor 38.1 of the comminuting arrangement 38 is particularly critical, since it is the first point of arrival of the coarse chunks 37 of the dried polymer strand 35. Consequently, the cross-vane comminutor or other crusher of the first comminutor 38.1 ought to have dimensions, in terms of its size and spacings between the functional rods and crushing rods on the rotating roll and/or on the fixed lattice grid, such that as far as possible even very large coarse chunks 37 are comminuted by this device and do not remain lying on it. On the other hand, the spacings ought to be small enough that the comminution of the coarse chunks to at any rate coarsely comminuted dried polymer particles 39.1 is already sufficient to allow them to be fed to a hammer grinding mill or other grinding mill or to a roll crusher, or even into a conveying screw. Moreover, in the case of a crusher, the spacings ought not to be too small, in order not to allow the mechanical forces acting on functional rods or other functional tools on a shaft, or acting on the shaft or a shaft drive thereof, to become too great.

For this purpose, FIG. 3A and FIG. 3B show schematically a shaft 10 having functional tools 14 disposed on and rotating with the shaft, in the form of functional rods or bars, relative to fixed rods or bars 16 of a lattice grid.

The functional rods 14 rotating with the shaft project vertically from the shaft 10 and have a length LF of 100 to 300 mm, preferably 100 to 200 mm, more particularly 100 to 150 mm. The fixed lattice rods of the lattice grid have a thickness DB (with the roof D shown in FIG. 5B) of 8 to 20 mm, preferably 9 to 15 mm, more particularly 10 to 12 mm, and also a height of 40 to 100 mm, preferably 50 to 90 mm, more particularly between 50 and 70 mm.

The clear spacing$\Delta$—here between 8 to 20 mm, preferably 9 to 15 mm, more particularly 10 to 12 mm—between the functional rods 14 and bars 16 is advantageously less than twice the thickness DF of the functional rods 14 or than the thickness DB of the bars 16. In the present case, the clear spacing $\Delta$ is approximately in the region of the thickness DF of the functional rods 14. The clear spacing a between the bars 16 is typically less than five times the thickness DF of the functional rods 14 or than the thickness DB of the bars 16. The clear spacing DS between the functional rods 14 is interengaged by the fixed bars 16 or lattice rods of the rod lattice. With regard to the lengths of the functional rods 14 or of the bars 16, LB for a cross-vane comminutor is approximately in the region of LF and LB for a milling cutter will be very much smaller than LF.

The shaft 10 in FIG. 3B carries the functional rods 14 in a helical arrangement, with the pitch of the helix being approximately between 20° and 70°, preferably at approximately 45°, and with the number of functional rods for a peripheral arrangement being 6 to 10, preferably 7 to 9, in the present case 8.

FIG. 4A, in a cross-sectional view along the axis of a cross-vane comminutor, more particularly for the disposition as first comminutor 38.1 of the comminuting arrangement 38, shows various embodiments of a lattice of rods or bars, in the form of fixed crushing rods.

In the case of the embodiment of view A1 in FIG. 4A, the continuous lattice and double-sidedly secured crushing rods 16 provide greater stability for the crushing rods 16. In accordance with the side view and plan view shown in view A1 of FIG. 4A, a lattice of crushing rods may extend in a straight line and be made continuous. For this purpose, the lattice of crushing rods 16 may be disposed below the shaft 10.

The lattice of crushing rods 16 may also be disposed at the level of the axis of the shaft 10 and, as shown in FIG. 4B, may in each case have unilaterally disposed crushing rods 16 on both sides of the shaft that end shortly before the shaft body 10 with a remaining gap s, and hence here end in a spacing.

As shown in view A2 of FIG. 4A, the lattice may also be disposed outside of the shaft body at the axial level of the shaft body 10 and may surround the shaft body 10 peripherally and beneath it; specifically, as shown by view A2 of FIG. 4A, approximately at a peripheral radius that corresponds approximately to the peripheral radius of the middles to ends of the functional rods 14. An advantageous consequence of this is that the functional rods 14 along their entire peripheral rotational movements are able to strike with maximum lever arm on coarse chunks 37 of the dried polymer strand of the dry cake 35 while these chunks are being held by the lattice 16.

This is the case only conditionally for the in each case unilaterally secured lattices in two-part implementation with the crushing rods 16 of the embodiment in FIG. 4B—moreover, the gap s between shaft body 10 and the end of the crushing rods 16 means that any very coarse chunks 37 that have not yet been comminuted pass into the gap s and become stuck there, or insufficiently comminuted coarse chunks fall through.

While this is avoided in the case of the embodiment A1 in FIG. 4A, by virtue of the continuous lattice and bilaterally secured crushing rods 16, the functional rods 14 on the shaft C possibly do not exert the maximum crushing effect when impinging onto the chunks 37, because the striking angle is somewhere between 180° and 90°; here, then, the lever arm of the functional rods 14 is not being optimally utilized. Nevertheless, all three embodiments prove already to be comparatively preferable for the optimization of a cross-vane comminutor or other crusher, instead of the first comminutor 38.1 of the comminuting arrangement 38.

View A4 in FIG. 4A shows a cassette model of a lattice of crushing rods 16 in a frame R with an advantageous geometry G on the top side of the crushing rods 16 or bars.

FIG. 5A shows for further strengthening a mounting of functional rods 14 on a shaft 10. According to the embodiment of view A1, the functional rods 14 may be welded to the shaft 10 to form a holder 12. The preferred embodiment of sleeves, sockets, collars or other holders 12 of the functional rods 14 is shown by view A2 of FIG. 5A. The functional rods 14 may for example be welded in this holder 12. A holder 12 for a functional rod 14 may also be formed, in accordance with view A3 of FIG. 5A, for example, by a functional rod 14 being passed through a passage along a diameter through the shaft 10 and welded, for example, in the holder 12 formed in this way.

For a lattice as per view A4 of FIG. 4A, i.e., for a cassette model of a lattice of crushing rods 16, views B1 and B2 of FIG. 5B show advantageous embodiments of a geometry G on the top side of the crushing rods 16 or bars. The rods or bars 16, which are already implemented in a web form and therefore comparatively stably, have a linear pointed edge, which preferably runs approximately centrally with respect to the axis of the top side of the otherwise preferably cuboidal crushing rod body. The point has a roof angle of 60° to 90° degrees. The roof angle of 60° to 90° may in principle be made pointed or rounded at the apex. In both cases, the result is a greater pressing force on a chunk 37, since the contact area on a bar or rod 16 of this kind is comparatively small. The more pointed the angle, and the more pointed the angle in degrees, the greater the crushing effect of the rod 16 will be. In principle, the rod 16 may be implemented solidly with the degree or in the form of a cuboid with an exposed hollow roof, as shown in view B2 of FIG. 5B.

FIG. 6A, with the detail of FIG. 6B, shows one particularly preferred embodiment of a shaft 10 having functional rods or bars along the axis of the shaft 10, the total number thereof being dependent on the width of the shaft or the width of the belt drier belt. In the present case a number of preferably between 5 to 15 functional rods are provided per periphery. View A of FIG. 6A shows the entire shaft 10, and view B shows an enlarged detail at one of the shaft 10. FIG. 6B shows the detail of a functional rod 14 having annular bodies 14.2 formed in one piece. The functional rod 14 consists of an annular body formed in one piece, as a part, with a bar body 14.1 adjoining it. The rod body 14 thus formed can be pushed by its annulus 14.2 onto the shaft 10, aligned at the correct angle at the location of the helix, and fixed or fusionally joined in such a way that the helical line—as shown in FIG. 6A—is formed. The annular body 14.2 on the shaft 10, in contrast to the securement of FIG. 5A, results in an even greater strength and introduction of force into the shaft 10, thereby having the overall effect of prolonging the lifetime of the striking arm 14.1. In principle, a functional rod of this kind shown in FIG. 6B can also be utilized at a relatively high rotational velocity of a shaft 10. A shaft 10 may in principle have a length of 2 to 6 m along its axis. Even at this length, a cross-vane comminutor with gap dimensions identified earlier on above between functional rods and crushing rods proves advantageous.

FIG. 7A shows a cumulative plot of proportions by mass of the sieve fractions for the graphical determination of the mass-average particle diameter after comminution.

The result of the measurement is plotted in the table below, tab. 1, with the sieve sizes; the values are reproduced in FIG. 7A. The mass-average particle diameter for the product flow 41 after comminution is approximately 3.7 mm, as is apparent from the plot and assignment of a mass-average particle diameter of particles for a 50% by weight value in FIG. 7A. The mass-average particle diameter after comminution is determined in accordance with EDANA Test Method No. WSP 220.2-05 "Particle Size Distribution". For the particle size distribution determination on the product flow 41 after comminution, however, sieves having mesh sizes of 0.6/1/2/3.15/4/5/6.3/8/10/14/20 mm are used (see below fraction). The mass-average particle diameter in this case is the value of the "mesh size" which results for the cumulative 50% by weight entered in FIG. 7A.

TABLE 1

| Fraction size | SAP Av. wt. (%) | Fraction | SAP Cum. wt. (%) |
| --- | --- | --- | --- |
| 0-600 μm | 3.3 | 0.6 mm | 3.3 |
| 600 μm-1 mm | 3.8 | 1 mm | 7.1 |
| 1 mm-2 mm | 15.9 | 2 mm | 23.0 |
| 2 mm-3.15 mm | 20.5 | 3.15 mm | 43.5 |
| 3.15 mm-4 mm | 10.8 | 4 mm | 54.4 |
| 4 mm-5 mm | 10.7 | 5 mm | 65.1 |
| 5 mm-6.3 mm | 9.1 | 6.3 mm | 74.1 |
| 6.3 mm-8 mm | 9.7 | 8 mm | 83.8 |
| 8 mm-10 mm | 5.9 | 10 mm | 89.7 |
| 10 mm-14 mm | 7.0 | 14 mm | 96.7 |
| 14 mm-20 mm | 3.3 | 20 mm | 100.0 |
| >20 mm | 0.0 | | 100.0 |

The mass-average particle diameter after grinding and sieving is determined at the product flow 47 analogously to the mass-average particle diameter after comminution and is shown in FIG. 7B. for the particle size distribution determination of a distribution, however, sieves having mesh sizes of 45/150/212/300/425/500/600/710/850 μm are used (see below fraction). A particular size distribution determination was carried out after grinding and sieving at product flow 47 at products, which were sieved between 150 and 850 μm, between 100 and 700 μm and between 100 and 600 μm.

The respective result of the measurement is plotted in the following tables with the sieve sizes; the values are reproduced in FIG. 7B. A mass-average particle diameter after grinding and sieving is produced at 150 and 850 μm product sieving of 570 μm (Tab. 2A), at 100 and 700 μm product sieving of 425 μm (Tab. 2B) and at 100 and 600 μm product sieving of 348 μm (Tab. 2C).

TABLE 2A

Product sieving
150 and 850 μm:

| Fraction size | SAP (%) rough | Fraction | Rough cum. % by weight |
|---|---|---|---|
| 0-45 μm | 0.1 | 45 μm | 0.1 |
| 45 μm-150 μm | 1.6 | 150 μm | 1.7 |
| 150 μm-212 μm | 4.0 | 212 μm | 5.7 |
| 212 μm-300 μm | 7.6 | 300 μm | 13.3 |
| 300 μm-425 μm | 14.1 | 425 μm | 27.4 |
| 425 μm-500 μm | 11.0 | 500 μm | 38.4 |
| 500 μm-600 μm | 16.9 | 600 μm | 55.3 |
| 600 μm-710 μm | 26.9 | 710 μm | 82.2 |
| 710 μm-850 μm | 17.7 | 850 μm | 99.9 |
| >850 μm | 0.1 | | 100.0 |

TABLE 2B

Product sieving
100 and 700 μm:

| Fraction size | SAP (%) | fraction | Medium cum. % by weight |
|---|---|---|---|
| 0-45 μm | 0.0 | 45 μm | 0.0 |
| 45 μm-150 μm | 5.5 | 150 μm | 5.5 |
| 150 μm-212 μm | 7.2 | 212 μm | 12.7 |
| 212 μm-300 μm | 12.6 | 300 μm | 25.3 |
| 300 μm-425 μm | 25.1 | 425 μm | 50.4 |
| 425 μm-500 μm | 18.8 | 500 μm | 69.2 |
| 500 μm-600 μm | 20.0 | 600 μm | 89.2 |
| 600 μm-710 μm | 9.6 | 710 μm | 98.8 |
| 710 μm-850 μm | 1.2 | 850 μm | 100.0 |
| >850 μm | 0.0 | | 100.0 |

TABLE 2C

Product sieving
100 and 600 μm:

| Fraction size | SAP (%) | fraction | Fine cum. % by weight |
|---|---|---|---|
| 0-45 μm | 0.0 | 45 μm | 0.0 |
| 45 μm-150 μm | 2.8 | 150 μm | 2.8 |
| 150 μm-212 μm | 11.4 | 212 μm | 14.2 |
| 212 μm-300 μm | 21.5 | 300 μm | 35.7 |
| 300 μm-425 μm | 38.0 | 425 μm | 73.7 |
| 425 μm-500 μm | 16.2 | 500 μm | 89.9 |
| 500 μm-600 μm | 8.6 | 600 μm | 98.5 |
| 600 μm-710 μm | 1.4 | 710 μm | 99.9 |
| 710 μm-850 μm | 0.1 | 850 μm | 100.0 |
| >850 μm | 0.0 | | 100.0 |

LIST OF REFERENCE SYMBOLS

10 shaft
14 functional rod
16 bars
14.1 functional rod body
14.2 annular body
31 reactants
30 reactor
32 buffer vessel/gel bunker
33 lumps with gellike consistency
34 conveying means
35 dry cake
36 belt drier
37 fragments of the dry cake or other coarse chunks
38 comminuting arrangement
38.1, 38.2 first comminutor, second comminutor
39, 39.1, 39.2 dried polymer particles, coarsely comminuted chunks, finer chunks
40 conveying/homogenizing means, optionally third comminutor
41 homogenized dried main-flow polymer particles
42 pneumatic conveying
43 dried polymer particles in pneumatic conveying
44 grinding
45 ground dried polymer particles
46 sieving apparatus
47 sieved, ground and dried polymer particles
U deflecting means
ZF milling comminutor
SF milling cutter
KFZ cross-vane comminutor
WB roll crusher
FS conveying screw

The invention claimed is:

1. A belt drier arrangement for drying an aqueous polymer gel and for comminuting the dried polymer gel to give dried polymer particles, comprising:
   a drier setup for drying an aqueous polymer gel,
   a comminuting arrangement downstream of the drier setup relative to the product flow direction, for comminuting the dried polymer gel to give dried polymer particles,
   wherein the comminuting arrangement is located downstream of the drier setup relative to the product flow direction immediately after the drier set up or or is mounted on said drier setup, wherein
   the comminuting arrangement comprises at least a first comminutor and a second comminutor, each having a rotatable shaft with functional tools, the second comminutor being disposed downstream of the first comminutor relative to the product flow direction wherein
   the first comminutor is located immediately after the drier setup for comminuting the precomminuted polymer gel to give dried polymer particles, and
   the first comminutor is configured as a milling comminutor,
   or the first comminutor is configured as a cross-vane comminutor, and
   the second comminutor is located alongside the first comminutor for receiving the precomminuted dried polymer particles, or
   the second comminutor is located below the first comminutor for receiving precomminuted dried polymer particles, wherein the second comminutor for receiving the precomminuted dried polymer particles from the first comminutor is located immediately below the first comminutor, wherein
   the second comminutor is configured for comminuting the precomminuted dried polymer particles to give finely comminuted polymer particles with a mass-average particle diameter of between 1 mm and 9 mm;
   wherein the comminuting arrangement is disposed upstream of a grinding facility relative to the product flow direction and the comminuting arrangement is disposed upstream of a pneumatic conveying facility relative to the product flow direction, wherein the pneumatic conveying facility is located between the comminuting arrangement and the grinding facility;
   wherein the grinding facility is configured for grinding comminuted dried polymer particles from the comminuting arrangement to give dried, comminuted and ground polymer particles, having a mass-average particle diameter of 250 μm to 700 μm.

2. The belt drier arrangement according to claim 1, wherein the second comminutor is located alongside the first comminutor, after a conveying screw (FS) for receiving the precomminuted dried polymer particles.

3. The belt drier arrangement according to claim 1, wherein
the second comminutor is located below the first comminutor without a conveying screw (FS) for receiving the precomminuted dried polymer particles.

4. The belt drier arrangement according to claim 1, wherein
the second comminutor is configured for comminuting the precomminuted dried polymer particles to give finely comminuted dried polymer particles with a mass-average particle diameter of between 1 mm and 5 mm.

5. The belt drier arrangement according to claim 1, wherein
the comminuting arrangement comprises a deflector, the first comminutor of the comminuting arrangement being disposed downstream of the deflector relative to the product flow direction.

6. The belt drier arrangement according to claim 5, wherein
the first comminutor is located for receiving a crushed material of dried polymer particles relative to the deflector, the deflector being oriented relative to the first comminutor in such a way that the crushed material of dried polymer falls into the first comminutor where the first comminutor is located below the deflector.

7. The belt drier arrangement according to claim 1, wherein
the comminuting arrangement is configured to comminute the precommunated and finely comminuted polymer particles at a temperature of between 40° C. and 140° C.

8. The belt drier arrangement according to claim 1, wherein
the first comminutor is configured as a milling comminutor with support table.

9. The belt drier arrangement according to claim 1, wherein
the second comminutor is configured as a cross-vane comminutor.

10. The belt drier arrangement according to claim 1, wherein
the second comminutor is configured as a roll crusher or conveying screw.

11. The belt drier arrangement according to claim 1, wherein
the comminuting arrangement comprises, as the second comminutor, a conveying screw, with a further comminutor of the comminuting arrangement being disposed immediately upstream of the conveying screw relative to the product flow direction.

12. The belt drier arrangement according to claim 10, wherein
the conveying screw is disposed below the second comminutor for receiving free-falling dried polymer particles from the comminutor, or
the conveying screw is disposed at an offset to the second comminutor for receiving deflected dried polymer particles from the comminutor.

13. The belt drier arrangement according to claim 1, wherein
the cross-vane comminutor comprises a rotatable shaft having functional rods, and a stationary rod grid disposed directly opposite the shaft, the rotatable functional rods engaging into interstices between stationary crushing rods of the rod grid, in order to comminute the dried polymer gel, where
the crushing rods have an axial spacing of not more than five times a thickness of the functional rods, and/or the functional rods and/or crushing rods have a length of not more than two times the diameter of the shaft.

14. The belt drier arrangement according to claim 1, wherein an axial gap between a functional rod and a crushing rod is lower than two times the axial width of the functional rod and/or than two times the axial width of the crushing rod, and/or the axial gap is less than 20 mm.

15. The belt drier arrangement according to claim 1, wherein
the first comminutor and/or the second comminutor is configured for rotating a shaft with a rotational velocity of more than 50 rpm and less than 250 rpm.

16. The belt drier arrangement according to claim 1, wherein the milling comminutor comprises a rotatable shaft having at least one functional rod which is configured for milling of dried polymer particles (unprecomminuted), and/or a number of functional tools are arranged along a working edge which follows a spiral, the spiral more particularly having a helix angle of between 20° to 70°.

17. The belt drier arrangement according to claim 1, wherein
the first comminutor has an upper working edge, which in the case of a milling comminutor is disposed at the level or below the level of a receiving surface of the conveying belt for receiving an ejection of the dried polymer particles, or
the first comminutor in the case of a milling comminutor has a working edge at the level or above the level of a receiving surface of the conveying belt, for milling the dried polymer particles and supporting the downward ejection of the dried polymer particles.

18. The belt drier arrangement according to claim 1, wherein
the grinding facility configured for grinding finely comminuted dried polymer particles from the comminuting arrangement to give dried, comminuted, and ground polymer particles, having a mass-average particle diameter of of between 300 μm to 600 μm.

19. The belt drier arrangement according to claim 1, wherein the comminuting arrangement is configured for a polymer particle residence time of below 90 sec in the comminuting arrangement.

20. A process for providing dried polymer particles, comprising: introducing an aqueous polymer gel into a drier setup and drying the aqueous polymer gel to provide a dried polymer gel, and operating a comminuting arrangement downstream of the drier setup relative to a product flow direction, to comminute the dried polymer gel to provide the dried polymer particles,
wherein
the comminuting arrangement is located downstream of the drier setup relative to the product flow direction immediately after the drier set up or is mounted on said drier setup
wherein
the comminuting arrangement comprises at least a first comminutor and a second comminutor, each having a rotatable shaft with functional tools, the second comminutor being disposed downstream of the first comminutor relative to the product flow direction wherein the first comminutor is located immediately after the drier setup for comminuting the precomminuted polymer gel to give dried polymer particles, and the first comminutor is configured as a milling comminutor, or the first comminutor is configured as a cross-vane comminutor, and the second comminutor is located alongside the first comminutor for receiving the precomminuted dried polymer particles, or the second comminutor is located below the first comminutor for receiving the precomminuted dried polymer particles, wherein the second comminutor for receiving precomminuted dried polymer particles from the first comminutor is located immediately below the first comminutor, wherein the second comminutor is configured for comminuting the precomminuted dried polymer particles to give finely comminuted dried polymer particles, with a mass-average particle diameter of between 1 mm and 9 mm;

wherein the comminuting arrangement is disposed upstream of a grinding facility relative to the product flow direction and the comminuting arrangement is disposed upstream of a pneumatic conveying facility relative to the product flow direction, in particular wherein the pneumatic conveying facility is located between the comminuting arrangement and the grinding facility;

wherein the grinding facility is configured for grinding comminuted dried polymer particles from the comminuting arrangement to give dried, comminuted and ground polymer particles, having a mass-average particle diameter of 250 µm to 700 µm.

21. The process according to claim 20, wherein the second comminutor, is configured for comminuting precomminuted dried polymer particles to give finely comminuted dried polymer particles, with a mass-average particle diameter of between 1 and 5 mm.

22. The process according to claim 20, wherein a grinding facility is configured for grinding comminuted dried polymer particles from the comminuting arrangement to give dried, comminuted and ground polymer particles, having a mass-average particle diameter of between 300 µm to 700 µm.

23. The process according to claim 20, wherein the comminuting arrangement is configured for a polymer particle residence time of below 90 sec in the comminuting arrangement.

\* \* \* \* \*